US011070793B2

(12) United States Patent
Li et al.

(10) Patent No.: US 11,070,793 B2
(45) Date of Patent: Jul. 20, 2021

(54) MACHINE VISION SYSTEM CALIBRATION

(71) Applicant: Cognex Corporation, Natick, MA (US)

(72) Inventors: Tuotuo Li, Newton, MA (US); Lifeng Liu, Sudbury, MA (US); Cyril C. Marrion, Acton, MA (US)

(73) Assignee: Cognex Corporation, Natick, MA (US)

( * ) Notice: Subject to any disclaimer, the term of this patent is extended or adjusted under 35 U.S.C. 154(b) by 512 days.

(21) Appl. No.: 15/221,152

(22) Filed: Jul. 27, 2016

(65) Prior Publication Data

US 2017/0032537 A1 Feb. 2, 2017

Related U.S. Application Data

(60) Provisional application No. 62/199,459, filed on Jul. 31, 2015.

(51) Int. Cl.
*H04N 17/00* (2006.01)
*G06T 7/73* (2017.01)
*G06T 7/80* (2017.01)

(52) U.S. Cl.
CPC ............ *H04N 17/002* (2013.01); *G06T 7/73* (2017.01); *G06T 7/80* (2017.01); *G06T 2207/30204* (2013.01); *G06T 2207/30244* (2013.01)

(58) Field of Classification Search
CPC ............................ H04N 17/002; G06T 7/248
See application file for complete search history.

(56) References Cited

U.S. PATENT DOCUMENTS

| 5,854,852 A | * | 12/1998 | Csipkes | G02B 6/3843 |
| | | | | 356/73.1 |
| 8,872,911 B1 | * | 10/2014 | Wallack | H04N 7/183 |
| | | | | 348/92 |
| 2009/0028440 A1 | * | 1/2009 | Elangovan | G06K 9/6202 |
| | | | | 382/216 |
| 2011/0010122 A1 | | 1/2011 | Ding | |

(Continued)

FOREIGN PATENT DOCUMENTS

| CN | 101221375 A | 7/2008 |
| CN | 104048674 A | 9/2014 |
| CN | 104182982 A | 12/2014 |

OTHER PUBLICATIONS

Chinese Office Action dated Sep. 3, 2018 and English translation thereof in connection with Chinese Application No. 201610621798.0.

*Primary Examiner* — John W Miller
*Assistant Examiner* — Sean N. Haiem
(74) *Attorney, Agent, or Firm* — Wolf, Greenfield & Sacks, P.C.

(57) ABSTRACT

Disclosed herein are systems and methods for machine vision. A machine vision system includes a motion rendering device, a first image sensor, and a second image sensor. The machine visions system includes a processor configured to run a computer program stored in memory that is configured to determine a first transformation that allows mapping between the first coordinate system associated with the motion rendering device and the second coordinate system associated with the first image sensor, and to determine a second transformation that allows mapping between the first coordinate system associated with the motion rendering device and the third coordinate system associated with the second image sensor.

16 Claims, 8 Drawing Sheets

(56) References Cited

U.S. PATENT DOCUMENTS

| 2011/0157373 A1* | 6/2011 | Ye | G06T 7/85 |
| | | | 348/187 |
| 2013/0010081 A1* | 1/2013 | Tenney | G05B 19/4086 |
| | | | 348/47 |
| 2014/0078260 A1 | 3/2014 | Taubin et al. | |

* cited by examiner

US 11,070,793 B2

MACHINE VISION SYSTEM CALIBRATION

CROSS-REFERENCE TO RELATED APPLICATIONS

This application claims the benefit under 35 U.S.C. § 119(e) of Provisional Application No. 62/199,459, filed Jul. 31, 2015, entitled "Machine Vision System Calibration," the entire contents of which are incorporated by reference here in its entirety.

TECHNICAL FIELD

Disclosed apparatus, systems, and computerized methods relate generally to a machine vision system and, more specifically, to calibrating a machine vision system.

BACKGROUND

In machine vision systems, one or more image capture devices can be used to perform vision system processes on an object or surface within an imaged scene. These processes can include inspection, image/symbol decoding, object alignment, and/or a variety of other tasks. In some applications, a machine vision system can be used to inspect a work piece disposed within or passing through an imaged scene. The scene can be imaged by one or more image capture devices. The images captured by the image capture devices can be processed by the machine vision system to determine information about features within the imaged scene, such as features real-world locations, poses, etc. In some applications, the image capture device can be calibrated to allow the machine vision system to perform vision tasks with increased accuracy and reliability.

In some cases, image capture devices in a vision system can be calibrated using a calibration target. A calibration target can be any object with accurately known (e.g., as a result of the manufacturing process or measurable dimensional characteristics. For example, a calibration target can include a calibration plate. A calibration plate can be a flat object with a distinctive pattern made visible on its surface. The distinctive pattern can be laid out such that the machine vision system or user can easily identify visible features in an image of the calibration plate acquired by an image capture device. Some exemplary patterns include dot grids, line grids, a honeycomb pattern, a checkerboard of squares, a checkerboard of triangles, etc. The patterns typically contain highly localizable features. The level of accuracy in localization of features can affect the accuracy of calibration.

Characteristics of each visible feature are known from the plate's design, such as the position and/or orientation relative to a reference position and/or coordinate system implicitly defined within the design. The features present in the design can include calibration features. Calibration features can be individual features in a calibration plate's design whose characteristics can be readily measured (for example, the feature's position, size, color, etc.), and whose intended characteristics by the nominal design are known. For example, some possible calibration feature positions include the corners or centers of checkerboard-pattern tiles, or the centers of dots in a dot grid, or the line crossings in a line grid.

Calibration plate designs can include a large number of calibration features arranged in a repetitive pattern. More basically, a calibration feature can be readily extracted from an acquired image and can provide known characteristics. In some applications, the known dimensional characteristics are used to calibrate the machine vision system.

SUMMARY

Some embodiments include a machine vision system. The machine vision system includes one or more interfaces configured to provide communication with a motion rendering device, a first image sensor, and a second image sensor. The motion rendering device is configured to provide at least one of a translational movement and an in-plane rotational movement, and is associated with a first coordinate system. The motion rendering device is configured to directly or indirectly carry a first calibration plate and a second calibration plate, and the first calibration plate and the second calibration plate comprise a first plurality of features with known physical positions relative to the first calibration plate and a second plurality of features with known physical positions relative to the second calibration plate, respectively. The first image sensor and the second image sensor are configured to capture an image of the first calibration plate and the second calibration plate, respectively, and the first image sensor and the second image sensor are associated with a second coordinate system and a third coordinate system, respectively. The machine vision system also includes a processor configured to run a computer program stored in memory. The computer program stored in memory is operable to cause the processor to send, via the one or more interfaces to the motion rendering device, first data configured to cause the motion rendering device to move to a requested first pose, receive, via the one or more interfaces from the motion rendering device, a reported first pose, receive, via the one or more interfaces from the first image sensor, a first image of the first calibration plate for the reported first pose, and receive, via the one or more interfaces from the second image sensor, a second image of the second calibration plate for the reported first pose. The computer program is also operable to cause the processor to determine a first plurality of correspondences between the first plurality of features on the first calibration plate and first positions of the first plurality of features in the first image, determine a second plurality of correspondences between the second plurality of features on the second calibration plate and second positions of the second plurality of features in the second image, determine a first transform between the first coordinate system and the second coordinate system based, at least in part, on the first plurality of correspondences and the reported first pose, and determine a second transform between the first coordinate system and the third coordinate system based, at least in part, on the second plurality of correspondences and the reported first pose.

Some embodiments include a machine vision system. The machine vision system includes one or more interfaces configured to provide communication with a motion rendering device, a first image sensor, and a second image sensor. The motion rendering device is configured to provide at least one of a translational movement and an in-plane rotational movement, and is associated with a first coordinate system. The motion rendering device is configured to directly or indirectly carry a first calibration plate and a second calibration plate, and the first calibration plate and the second calibration plate comprise a first plurality of features with known physical positions relative to the first calibration plate and a second plurality of features with known physical positions relative to the second calibration plate, respectively. The first image sensor and the second image sensor are configured to capture an image of the first calibration plate and the second calibration plate, respectively, and the first image sensor and the second image sensor are associated with a second coordinate system and a third coordinate system, respectively. The machine vision system also includes a processor configured to run a computer program stored in memory. The computer program stored in memory is operable to cause the processor to send, via the one or more interfaces to the motion rendering device, first data configured to cause the motion rendering device to move to a requested first pose, receive, via the one or more interfaces from the motion rendering device, a reported first pose, receive, via the one or more interfaces from the first image sensor, a first image of the first calibration plate for the reported first pose, and receive, via the one or more interfaces from the second image sensor, a second image of the second calibration plate for the reported first pose. The computer program is also operable to cause the processor to determine a first plurality of correspondences between the first plurality of features on the first calibration plate and first positions of the first plurality of features in the first image, determine a second plurality of correspondences between the second plurality of features on the second calibration plate and second positions of the second plurality of features in the second image, determine a first transformation that allows mapping between the first coordinate system associated with the motion rendering device and the second coordinate system associated with the first image sensor, and determine a second transformation that allows mapping between the first coordinate system associated with the motion rendering device and the third coordinate system associated with the second image sensor.

Some embodiments include another type of a machine vision system. The machine vision system includes one or more interfaces configured to provide communication with a motion rendering device, a first image sensor, and a second image sensor. The motion rendering device is configured to provide at least one of a translational movement and an in-plane rotational movement, and is associated with a first coordinate system, and the motion rendering device is further configured to directly or indirectly carry the first image sensor and the second image sensor. The first image sensor and the second image sensor are configured to capture an image of the first calibration plate and the second calibration plate, respectively, and the first image sensor and the second image sensor are associated with a second coordinate system and a third coordinate system, respectively. The first calibration plate and the second calibration plate comprise a first plurality of features with known physical positions relative to the first calibration plate and a second plurality of features with known physical positions relative to the second calibration plate, respectively. The machine vision system also includes a processor configured to run a computer program stored in memory. The computer program is operable to cause the processor to send, via the one or more interfaces to the motion rendering device, first data configured to cause the motion rendering device to move to a requested first pose, receive, via the one or more interfaces from the motion rendering device, a reported first pose, receive, via the one or more interfaces from the first image sensor, a first image of the first calibration plate for the reported first pose, and receive, via the one or more interfaces from the second image sensor, a second image of the second calibration plate for the reported first pose. The computer program is further operable to cause the processor to determine a first plurality of correspondences between the first plurality of features on the first calibration plate and first positions of the first plurality of features in the first image, determine a second plurality of correspondences between the second plurality of features on the second calibration plate and second positions of the second plurality of features in the second image, determine a first transform between the first coordinate system and the second coordinate system based, at least in part, on the first plurality of correspondences and the reported first pose, and determine a second transform between the first coordinate system and the third coordinate system based, at least in part, on the second plurality of correspondences and the reported first pose.

Some embodiments include another type of a machine vision system. The machine vision system includes one or more interfaces configured to provide communication with a motion rendering device, a first image sensor, and a second image sensor. The motion rendering device is configured to provide at least one of a translational movement and an in-plane rotational movement, and is associated with a first coordinate system. The motion rendering device is further configured to directly or indirectly carry a target object comprising a plurality of features with unknown physical positions. The first image sensor and the second image sensor are configured to capture an image of a first subset and a second subset of the plurality of features in the target object, respectively, and the first image sensor and the second image sensor are associated with a second coordinate system and a third coordinate system, respectively. The machine vision system further includes a processor configured to run a computer program stored in memory. The computer program is operable to cause the processor to send, via the one or more interfaces to the motion rendering device, first data configured to cause the motion rendering device to move to a requested first pose, receive, via the one or more interfaces from the motion rendering device, a reported first pose, receive, via the one or more interfaces from the first image sensor, a first image of the first subset of the plurality of features for the reported first pose, and receive, via the one or more interfaces from the second image sensor, a second image of the second subset of the plurality of features for the reported first pose. The computer program is further operable to cause the processor to determine the first subset of features on the target object in the first image, determine the second subset of features on the target object in the second image, determine a first transform between the first coordinate system and the second coordinate system based, at least in part, on the first subset of the plurality of features and the reported first pose, and determine a second transform between the first coordinate system and the third coordinate system based, at least in part, on the second subset of the plurality of features and the reported first pose.

Some embodiments include another type of a machine vision system. The machine vision system includes one or more interfaces configured to provide communication with a motion rendering device, a first image sensor, and a second image sensor. The motion rendering device is configured to provide at least one of a translational movement and an in-plane rotational movement, and is associated with a first coordinate system. The motion rendering device is also configured to directly or indirectly carry the first image sensor and the second image sensor. The first image sensor and the second image sensor are configured to capture an image of a target object comprising a plurality of features with unknown physical positions, and the first image sensor and the second image sensor are associated with a second coordinate system and a third coordinate system, respectively. The machine vision system also includes a processor configured to run a computer program stored in memory.

The computer program is operable to cause the processor to send, via the one or more interfaces to the motion rendering device, first data configured to cause the motion rendering device to move to a requested first pose, receive, via the one or more interfaces from the motion rendering device, a reported first pose, receive, via the one or more interfaces from the first image sensor, a first image of a first subset of the plurality of features for the reported first pose, and receive, via the one or more interfaces from the second image sensor, a second image of a second subset of the plurality of features for the reported first pose. The computer program is further operable to cause the processor to determine the first subset of features on the target object in the first image, determine the second subset of features on the target object in the second image, determine a first transform between the first coordinate system and the second coordinate system based, at least in part, on the first subset of the plurality of features and the reported first pose, and determine a second transform between the first coordinate system and the third coordinate system based, at least in part, on the second subset of the plurality of features and the reported first pose.

In some embodiments, the computer program is operable to cause the processor to determine a motion correction transform that compensates for a systematic motion error associated with the motion rendering device.

In some embodiments, the computer program is operable to cause the processor to re-calibrate the machine vision system after a first period of time, comprising re-determining: the first plurality of correspondences, the second plurality of correspondences, the first transformation, and the second transformation. In some embodiments, re-calibrating the machine vision system comprises adjusting one or more pre-calibrated parameters.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
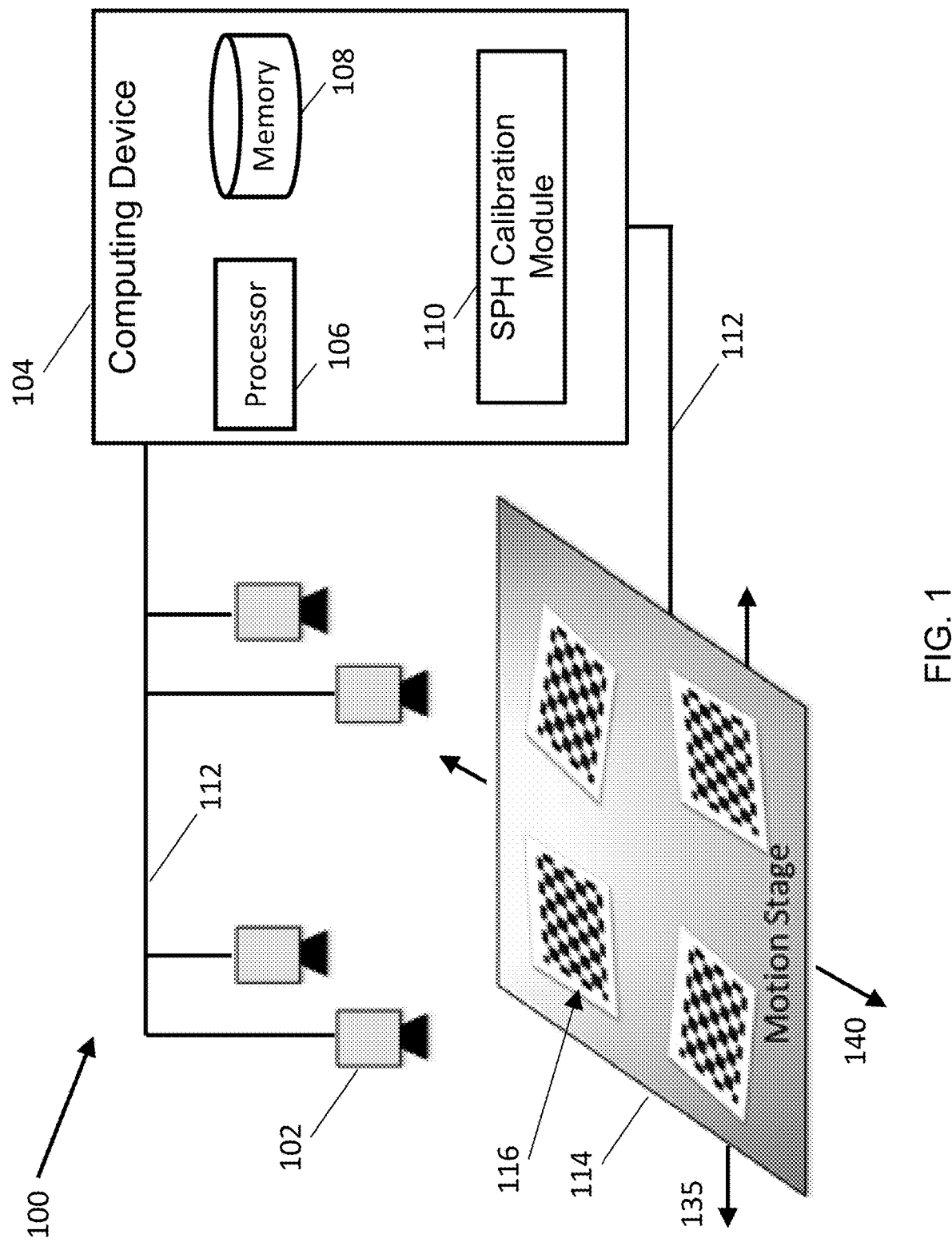
FIG. 1 illustrates a separate plate-based hand-eye (SPH) calibration system in accordance with some embodiments.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

The following introduces exemplary explanations of terms, according to one or more embodiments, that are used throughout the specification. These explanations are not intended to be limiting.

Two often important components in automated industrial systems are a machine vision system and a motion rendering device. The vision system can provide important information of the runtime environment, so that the motion rendering device can become context aware. In some of the high precision tasks, vision systems can provide visual feedback of the state of the motion rendering device, so that adjustment can be made to improve the accuracy of the motion rendering device, forming a close loop control system. Oftentimes, the machine vision system uses an image capture device to detect visual information around the motion rendering device.

In order to use the information obtained from an image capture device, the machine vision system should be able to translate between the coordinate system of the image capture device and the coordinate system of the motion rendering device. The relationship between (1) the coordinate system of the image capture device and (2) the coordinate system of the motion rendering device can be established though a procedure called hand-eye calibration, where the hand refers to the motion rendering device, while the eye refers to the vision system.

Typically, a hand-eye calibration involves using the motion rendering device to move a calibration target, such as a calibration plate, to multiple different poses. At each different pose, the vision system can take images around the calibration target. From the intended motion of the motion rendering device and the motion observed by the vision system, the calibration system can determine the transform between the coordinate systems of the vision system and the motion rendering device. In some cases, instead of moving the calibration target, the motion rendering device can move image capturing devices with respect to the calibration target to achieve the same goal.

An often accurate and commonly used calibration target for hand-eye calibration is a single, large calibration plate, which is often larger than a field-of-view of a single image capture device or larger than the area spanned by the FOVs of multiple image capture devices. A large calibration plate can include a large number of reliable features with known physical dimensions. Therefore, a large calibration plate allows the calibration system to provide accurate hand-eye calibration. However, a large calibration plate is often too bulky for a variety of applications. In fact, a large calibration plate based calibration system may require human intervention, may increase the maintenance cost, or may be impractical in some applications.

The embodiments disclosed herein address the issues associated with a large calibration plate based calibration system. In particular, the disclosed embodiments provide two hand-eye calibration mechanisms that improve the flexibility of the hand-eye calibration system. The disclosed embodiments allow hand-eye calibration to be deployed in applications that had been impractical for a large calibration plate based calibration system. These calibration mechanisms are referred to as a separate calibration plate-based hand-eye (SPH) calibration mechanism and a tracked feature-based hand-eye (TFH) calibration mechanism, and calibration systems that implement these mechanisms are referred to as a SPH calibration system and a TFH calibration system, respectively.

In some embodiments, the SPH calibration system can be configured to use a plurality of small calibration plates for hand-eye calibration, instead of a single large calibration plate. In some embodiments, there is one small calibration plate per image capture device. In some embodiments, the plurality of small calibration plates can be mounted rigidly and parallel to the motion plane. The use of smaller calibration plates can improve the flexibility of the calibration mechanism: because the SPH calibration system does not rely on a bulky, large calibration plate, the SPH calibration system can be deployed in applications that were previously impractical. For example, on very large flat screen TVs, it is more practical to mount separate calibration plates on an actual part than to construct a very large calibration plate.

One of the typical challenges with using a plurality of small calibration plates is that the plurality of calibration plates are not aligned with respect to one another. In other words, one or more of the plurality of small calibration plates can have a different in-plane rotation because it is difficult to perfectly align the in-plane rotation of the calibration plates. Also, each of the small calibration plates is often associated with its own unique coordinate system. Therefore, the SPH calibration system can be configured to determine not only the relative in-plane rotations and the translations between the calibration plates, but the actual coordinate systems of the calibration plates. Such a challenge often does not arise when a single large calibration plate is used.

In some embodiments, the TFH calibration system uses a runtime object—as a calibration target of hand-eye calibration. Because a runtime object is used as a calibration target, the TFH calibration system does not require users to create, purchase, maintain, and store calibration plates. Furthermore, the use of a runtime object can improve the flexibility of the calibration mechanism. Although a runtime object may provide less number of reliable calibration features than a large calibration plate, the TFH calibration mechanism can improve the flexibility of the calibration system. Because the TFH calibration system does not rely on a bulky, large calibration plate, the TFH calibration system can be deployed in applications that were previously impractical.

The hand-eye calibration is typically a non-linear problem due to lens distortions in image capture devices. Unfortunately, such a non-linear problem cannot be solved easily and efficiently because the non-linear problem may include local solutions and existing non-linear optimization techniques may not be able to identify the global solution efficiently.

To address this issue, in some embodiments, the SPH calibration system and the TFH calibration system can use a two-step approach to hand-eye calibration. For example, in the first step of the calibration method, the SPH calibration system can linearly approximate the relationship between coordinate transforms, and solve this linear relationship to determine an approximate solution to hand-eye calibration. Subsequently, in the second step, the SPH calibration system can solve the actual non-linear problem by initializing the non-linear optimization technique using the approximate solution from the first step. Because the approximate solution from the first step is close to the global solution of hand-eye calibration, the non-linear optimization technique can efficiently identify the global solution. A similar two-step approach can be used by the TFH calibration system as well.

In some embodiments, the SPH calibration system and the TFH calibration system can operate in a stationary image capture device configuration. In the stationary image capture device configuration, the physical position of the image capture devices remains unchanged when the motion rendering device moves. Typically, when calibrating image capture devices on such a system, calibration object or runtime object is affixed to the motion rendering device and is moved by the motion rendering device during calibration. In this configuration, the positions among all image capture devices remain unchanged.

In some embodiments, the SPH calibration system and the TFH calibration system can operate in a moving image capture device configuration. In the moving image capture device configuration, the image capture devices may be mounted on the motion rendering device so that their physical positions change relative to the motion rendering device's home position. Typically, when calibrating image capture devices on such a system, a calibration plate is affixed to the machine's base and remains stationary during calibration, while the motion rendering device moves the image capture devices around. In this configuration, the relative position among all image capture devices remains unchanged. In some embodiments the motion rendering device motion must be parallel to the calibration object or the runtime object.

In some embodiments, the SPH calibration system and the TFH calibration system can model systematic errors in the motion rendering device and determine the relationship between the parameters used to control the motion rendering device, e.g., (x, y, θ), and the actual physical pose of the motion rendering device in the home coordinate system.

SPH Calibration System

FIG. 1 illustrates a SPH calibration system in accordance with some embodiments. FIG. 1 shows a machine vision system 100 and a motion rendering device 114. The machine vision system 100 includes one or more image capture devices 102 generally directed toward a scene including the motion rendering device 114. An image capture device 102 can include a charge-coupled device (CCD) image sensor or a complementary metal-oxide-semiconductor (CMOS) image sensor, line-scan sensors, flying spot scanners, electron microscopes, X-ray devices including computed tomography (CT) scanners, magnetic resonance imagers, and/or other devices known to those skilled in the art.

In some embodiments, the machine vision system 100 includes a computing device 104. The computing device 104 can include a processor 106 and a memory device 108. The processor 106 can execute instructions and one or more memory devices 108 can store instructions and/or data. The memory device 108 can be a non-transitory computer readable medium, such as a dynamic random access memory (DRAM), a static random access memory (SRAM), flash memory, a magnetic disk drive, an optical drive, a programmable read-only memory (PROM), a read-only memory (ROM), or any other memory or combination of memories. The memory device 108 can be used to temporarily store data. The memory device 108 can also be used for long-term data storage. The processor 106 and the memory device 108 can be supplemented by and/or incorporated into special purpose logic circuitry.

In some embodiments, the computing device 104 can include a SPH calibration module 110. The SPH calibration module 110 can be configured to coordinate the SPH calibration mechanism. The SPH calibration module 110 can be configured to send, via the one or more interfaces 112 to the motion rendering device 114, first data configured to cause the motion rendering device to move to a requested first pose. The SPH calibration module 110 can also be configured to receive, via the one or more interfaces 112 from the motion rendering device 114, a reported first pose, receive, via the one or more interfaces 112 from the first image sensor, a first image of the first calibration plate for the reported first pose, receive, via the one or more interfaces 112 from the second image sensor, a second image of the second calibration plate for the reported first pose, determine a first plurality of correspondences between the first plurality of features on the first calibration plate and first positions of the first plurality of features in the first image, determine a second plurality of correspondences between the second plurality of features on the second calibration plate and second positions of the second plurality of features in the second image, determine a first transform between the first coordinate system and the second coordinate system based, at least in part, on the first plurality of correspondences and the reported first pose, and determine a second transform between the first coordinate system and the third coordinate system based, at least in part, on the second plurality of correspondences and the reported first pose.

In some embodiments, the SPH calibration module 110 can determine the first transform and the second transform in a two-step process. In the first step, the SPH calibration module 110 can construct a linear system that relates the unknown parameters, the correspondences of features, and a reported pose of the motion rendering device 114. Subsequently, the SPH calibration module 110 can determine estimates of the unknown parameters by iterative solving the linear system and non-linear single camera calibration steps. In the second step, the SPH calibration module 110 can construct a non-linear system that minimizes the feature re-projection error, and solve the non-linear system using a non-linear solver. In this second step, the solution of the linear system can be used as initial value for the non-linear solver. In some embodiments, the transforms are simultaneously solved using all the correspondences and reported pose of the motion rendering device.

In some embodiments, the SPH calibration module 110 can be implemented in digital electronic circuitry, or in computer hardware, firmware, software, or in combinations of them. The implementation can be as a computer program product, e.g., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

In some embodiments, the computing device 104 can include one or more interfaces 112. The one or more interfaces 112 can be configured to provide communication between the computing device 104 and the motion rendering device 114 or the image capture devices 102. The one or more interfaces 112 can be implemented in hardware to send and receive signals in a variety of mediums, such as optical, copper, and/or wireless interfaces, and in a number of different protocols, some of which may be non-transient.

In some embodiments, the computing device 104 can include a server. The server can operate using operating system (OS) software. In some embodiments, the OS software is based on a Linux software kernel and runs specific applications in the server such as monitoring tasks and providing protocol stacks. The OS software allows server resources to be allocated separately for control and data paths. For example, certain packet accelerator cards and packet services cards are dedicated to performing routing or security control functions, while other packet accelerator cards/packet services cards are dedicated to processing user session traffic. As network requirements change, hardware resources can be dynamically deployed to meet the requirements in some embodiments.

In some embodiments, the motion rendering device 114 can be configured to provide motion to an object that is disposed on the motion rendering device 114. The motion rendering device 114 can include an end-effector of a robot arm, a motion stage, or any kinds of devices that are capable of providing motion to an object that is disposed on the devices.

In some embodiments, in a stationary image capture device configuration, the motion rendering device 114 can be configured to carry the plurality of calibration plates 116, and the plurality of calibration plates 116 can be imaged by stationary image capture devices 102. The motion rendering device 114 can be configured to translate along the x axis 135 and/or the y axis 140, thereby translating the plurality of calibration plates 116. The motion rendering device 114 can also provide an in-plane rotation, thereby rotating the calibration plates 116 as well.

In some embodiments, each calibration plate 116 can be small enough such that each calibration plate 116 can cover the majority of the field of view of a single image capture device 102. In some embodiments, the calibration target is planar, and remains in the same physical plane while the calibration target is moved to various places in the field-of-view of each image capture device.

In some embodiments, each image capture device's optical axis need not be perpendicular to the plane of the calibration targets 116. The initial in-plane orientation of the calibration targets 116 relative to the image capture device's image coordinate axes, as defined by the placement of the calibration targets 116 onto the motion rendering device 114, can be arbitrary.

In some embodiments, in a moving image capture device configuration, the plurality of calibration plates 116 can be stationary, and the image capture devices 102 can be mounted on the motion rendering device 114 so that the image capture devices 102 can be configured to move relative to the plurality of calibration plates 116.

In some embodiments, one or more images captured by the image capture devices 102 can be transmitted to the computing device 104 for further processing. The one or more images can be transmitted via the one or more interfaces 112.

In some embodiments, the computing device 104 can be configured to receive the one or more images via the one or more interfaces 112, and the motion rendering device poses via the one or more interfaces 112, and provide the received images and motion rendering device poses to the SPH calibration module 110. Subsequently, the SPH calibration module 110 can be configured to process the received images of the plurality of calibration plates 116 as well as the motion rendering device poses to determine the coordinate transforms between the coordinate systems of the image capture devices 102 and the coordinate system of the motion rendering device 114.

Although FIG. 1 depicts the machine vision system 100 with four image capture devices 102, in some embodiments, the machine vision system 100 can include a fewer or greater number of image capture devices 102, all generally directed toward a scene. In some embodiments, a single image capture device can be used to image the scene.

Although FIG. 1 depicts the motion rendering device 114 as capable of translation along x axis 135 and/or y axis 140, in some embodiments, the motion rendering device 114 can provide a three dimensional (3D) motion, including at least one of a translation component along a z axis that is perpendicular to the plane defined by the x and y axes, and/or tilt/rotation out of the x-y plane. In some embodiments, the computing device 104 can be entirely self-contained within the image capture device 102, partially contained within the image capture device 102, or external to the image capture device 102.

Coordinate Systems

In some embodiments, the SPH calibration module 110 associates a coordinate system to one or more components in the calibration system. The coordinate systems used in the SPH calibration module 110 can be provided as follows:

Home coordinate system (Home2D): Home2D is the base reference space in which all other coordinate spaces and their relationships are described. Home2D is orthonormal and is defined by the x-axis and the center of rotation of the motion rendering device 114. For example, the x-axis of Home2D is aligned with the motion rendering device's x-axis, and the y-axis of Home2D is defined as 90 degrees from the x-axis. The positive y-axis direction is in the same general direction as the motion rendering device's y-axis. The length unit along the axes is either provided by the pattern on the calibration plate or by the motion rendering device's x unit travel, depending on whether the calibration plate or the motion rendering device's motion is deemed to be more accurate. The origin of Home2D is at the motion rendering device's center of rotation when the device is at the home position. There is only one Home2D coordinate system in the calibration system.

Image coordinate system (Raw2D): Raw2D is the pixel space coordinate system of a single image capture device. There is one instance of such a coordinate system for each image capture device 102. Image features are initially detected in this coordinate system. Due to lens and perspective distortion, Raw2D is not an orthonormal space relative to the Home2D coordinate system. Each image capture device's Raw2D coordinate system is independent of other image capture devices' Raw2D coordinate system.

Image capture device coordinate system (Camera2D): Camera2D is the physical space orthonormal coordinate system (as viewed in Home2D) for a single image capture device 102. There is one instance of such a coordinate system for each image capture device 102. It has the same length units as the Home2D coordinate system. The origin of Camera2D is at a position in Home2D that corresponds to the center of the image capture device's image window. Its x axis is parallel to the Raw2D x axis at the Camera2D origin. In some embodiments, the SPH calibration module 110 linearizes Raw2D at the window center, and takes the direction of the linearized x axis, and takes the general direction of the y axis. Each image capture device's Raw2D coordinate system is related to that image capture device's Camera2D system by the single-view, single-image capture device, calibration model. In the moving-image capture device configuration, each image capture device's Camera2D coordinate depends on the pose of the motion rendering device as commanded by the SPH calibration module 110 because when the motion rendering device 114 moves to a particular pose, the image capture device 102 moves along with the motion rendering device 114. Therefore, in this case, the Camera2D coordinate system is also moved relative to the Home2D coordinate system. In the stationary-image capture device configuration Camera2D is independent of the pose of the motion rendering device as commanded by the SPH calibration module 110.

Calibration plate coordinate system (Plate2D): Plate2D is the coordinate system of a calibration plate. There is one instance of such a coordinate system for each calibration plate. A calibration plate includes a well-defined calibration pattern, which usually includes at least one fiducial to define a coordinate system origin and coordinate axes direction of the calibration target. At any instance of time, all calibration features within a single calibration plate, viewed by all image capture devices, are described in the same Plate2D coordinate system. However, this space may be moved around in Home2D coordinates by the motion rendering device 114. Plate2D is an orthonormal coordinate system (as viewed in Home2D), although its length unit may have a non-identity scale factor from Home2D. Plate2D and Home2D may have different handedness. Each calibration target's Plate2D coordinate system is independent of other calibration plates' Plate2D coordinate system.

In the stationary-image capture device configuration (e.g., moving plate), Plate2D depends on the pose of the motion rendering device 114 as commanded by the calibration system. Because the calibration target 116 moves with the motion rendering device 114, the Plate2DFromStage2D transform is a fixed transform even when the motion rendering device 114 is moved to a different pose. However, the Home2DFromPlate2D transform is not fixed when the motion rendering device 114 is moved to a different pose. Therefore, the Plate2D coordinate system moves relative to the Home2D coordinate system when the motion rendering device 114 is moved to a different pose.

In the moving-image capture device configuration, the Plate2D is independent of the pose of the motion rendering device as commanded by the SPH calibration module 110.

Calibration object coordinate system (Part2D): This is a more general coordinate system associated with the calibration object (which might not be a calibration plate). Part2D is used to represent the relative positions of the features on the calibration object. In some embodiments, Part2D can be set to be identical to Home2D or Stage2D.

Stage coordinate system (Stage2D): Stage2D is an orthonormal coordinate system (as viewed in Home2D) that is attached to the motion rendering device, and thus, moves along with the motion rendering device. The relationship between Home2D and Stage2D is given by a 2-dimensional rigid transform, which is an identity transform when the motion rendering device 114 is at the home position.

In some embodiments, Home2DFromStage2D refers to an actual physical pose of the motion rendering device in Home2D. Home2DFromStage2D can define the relationship between Home2D and Stage2D and can be represented by a 2D Rigid transform.

In some embodiments, the SPH calibration module 110 is configured to operate under an assumption that the handedness of Home2D, Camera2D, and Plate2D are independent. The handedness refers to a relative position of the x and y axes. The Home2D handedness is determined by the directions of the motion stage's axes. The Plate2D handedness comes with the pattern on the calibration plate. The Camera2D handedness is determined by the number of mirrors in the optical path between the calibration plate and an image sensor.

In some embodiments, uncorrectedHome2DFromStage2D can indicate the commanded or reported pose of the motion rendering device 114. Due to systematic errors in the motion rendering device 114, the commanded or reported pose of the motion rendering device 114 may not match the actual physical pose of the motion rendering device 114 in Home2D (e.g., Home2DFromStage2D). Therefore, uncorrectedHome2DFromStage2D, in some sense, represents the best guess of the pose of the motion rendering device prior to calibration.

Figure 2A:
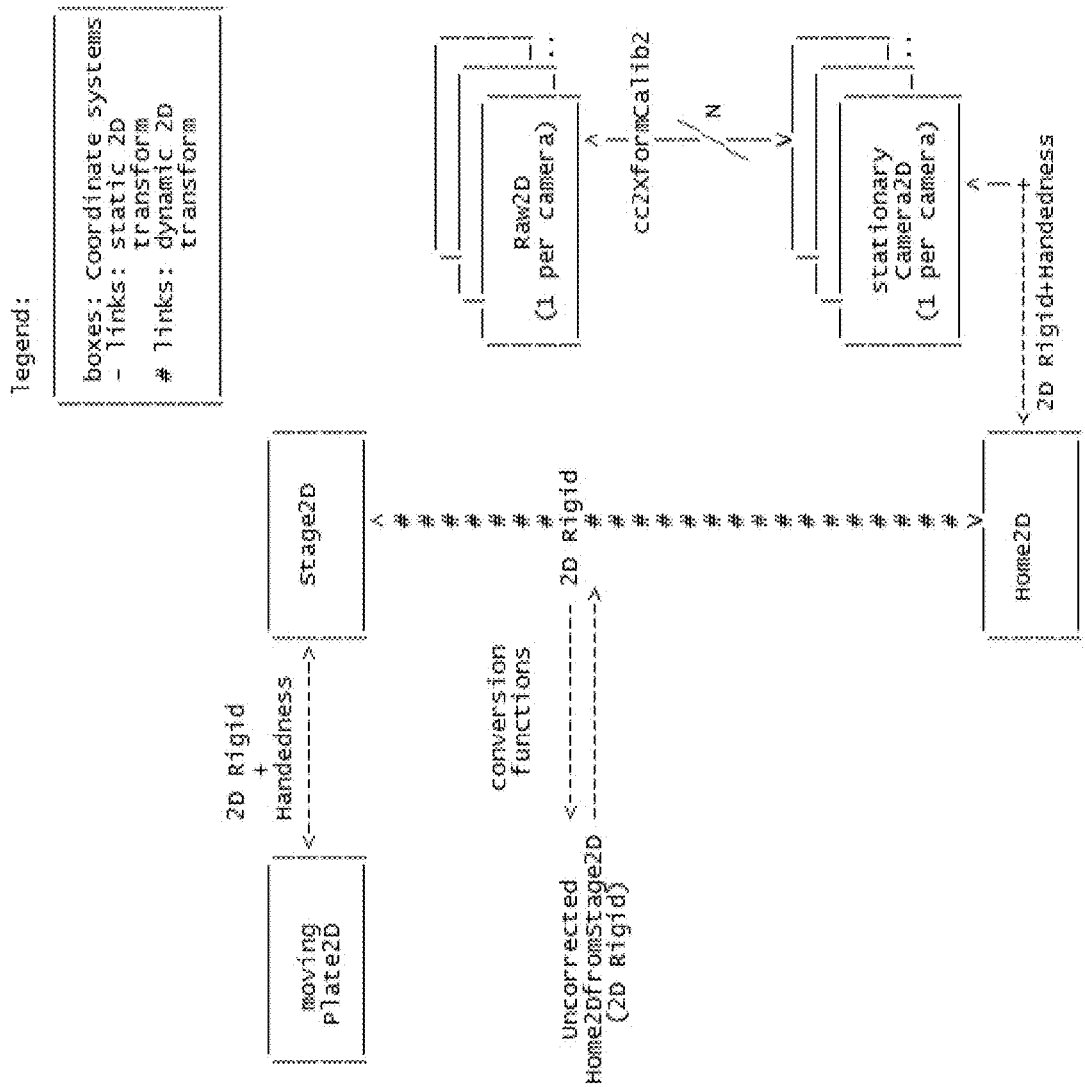
FIG. 2A illustrates a relationship between coordinate systems in a stationary image capture device mode in accordance with some embodiments.
Figure 2B:
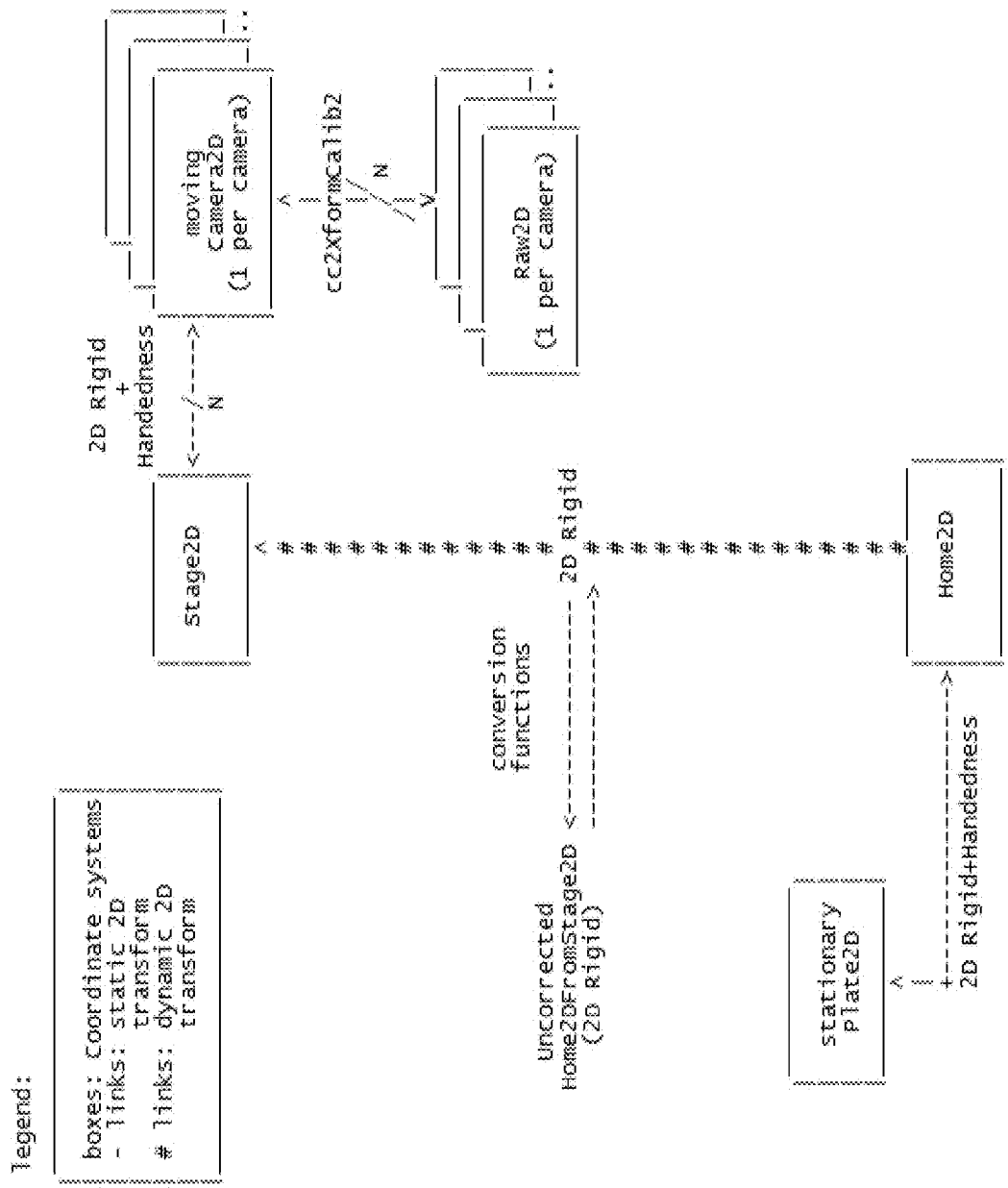
FIG. 2B illustrates a relationship between coordinate systems in a moving image capture device mode in accordance with some embodiments.

FIG. 2A illustrates a relationship between coordinate systems in a stationary image capture device mode in accordance with some embodiments; FIG. 2B illustrates a relationship between coordinate systems in a moving image capture device mode in accordance with some embodiments.

Figure 3:
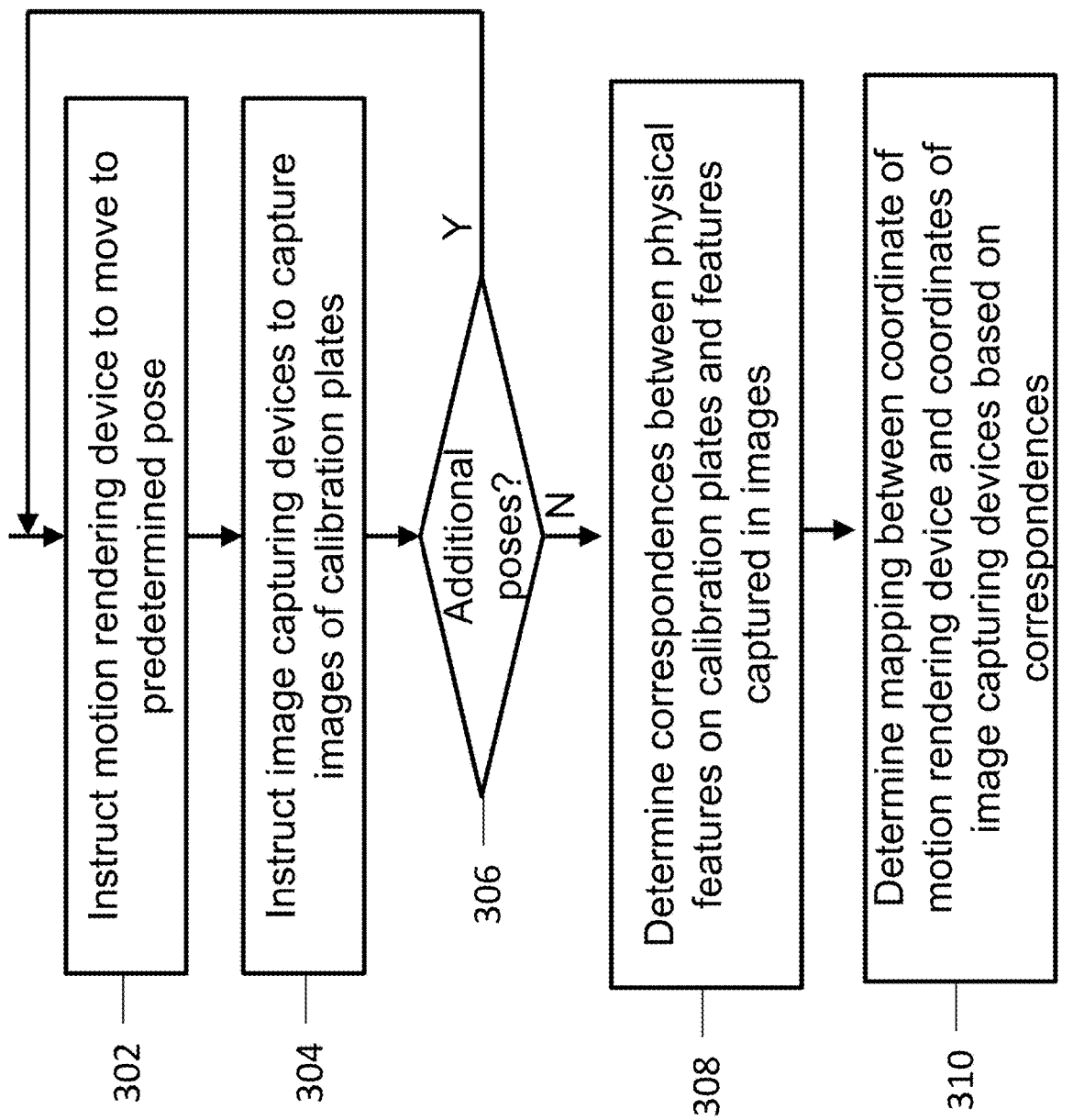
FIG. 3 illustrates an operation of a SPH calibration module in a SPH calibration system in accordance with some embodiments.

FIG. 3 illustrates an operation of a SPH calibration module in a SPH calibration system in accordance with some embodiments.

The SPH calibration module 110 is configured to determine a relationship between coordinate systems of one or more image capture devices 102 (e.g., Raw2D) and coordinate systems associated with a motion rendering device 114 (Home2D). In some embodiments, the SPH calibration module 110 is configured to establish correspondences between Raw2D feature locations found in images taken by the image capture devices 102 to the physical Home2D locations of these features as the motion rendering device 114 moves through a known set of poses.

In some embodiments, the motion rendering device 114 carries the plurality of calibration plates 116. In such embodiments, the SPH calibration system is said to operate in a stationary-image capture device configuration. In other embodiments, the motion rendering device 114 carries the image capture devices 102. In such embodiments, the SPH calibration system is said to operate in a moving-image capture device configuration.

In step 302, the SPH calibration module 110 is configured to instruct a motion rendering device 114 to move to a predetermined pose. Once the motion rendering device 114 receives the instruction, the motion rendering device 114 moves to the predetermined pose, and reports back, to the SPH calibration module 110, a reported pose of the motion rendering device 114. The actual pose of the motion rendering device 114 may be different from the commanded pose instructed by the SPH calibration module 110 due to the limited accuracy of the motion rendering device 114.

In step 304, the SPH calibration module 110 is configured to instruct image capture devices 102 to capture images of the plurality of calibration plates. Once the image capture devices 102 receive the instruction, each image capture device 102 can capture an image of a corresponding calibration plate 116 and transmit the captured image to the SPH calibration module 110.

In some embodiments, there may be a one-to-one correspondence between an image capture device and a calibration plate. For example, a first image capture device can be configured to capture an image of a first calibration plate; a second image capture device can be configured to capture an image of a second calibration plate; and a third image capture device can be configured to capture an image of a third calibration plate. In other embodiments, there may be a many-to-one correspondence between an image capture device and a calibration plate. For example, a first image capture device and a second image capture device can be configured to capture an image of a first calibration plate; and a third image capture device and a fourth image capture device can be configured to capture an image of a second calibration plate.

In step 306, the SPH calibration module 110 is configured to determine whether there are additional poses at which images of the calibration plates 116 should be captured. When there are additional poses at which images of the calibration plates 116 should be captured, the SPH calibration module 110 can go to step 302. When there are no additional poses at which images of the calibration plates 116 should be captured, then the SPH calibration module 110 can go to step 308.

In step 308, the SPH calibration module 110 is configured to determine correspondences between physical feature locations on the calibration plates and Raw2D feature locations captured in images. For example, the SPH calibration module 110 can use a feature finder technique to determine locations of features captured in images. Subsequently, the SPH calibration module 110 can determine a correspondence between the determined Raw2D feature locations captured in images and the known physical Plate2D feature locations.

In step 310, the SPH calibration module 110 can use the correspondences and the one or more poses of the motion rendering device 114 to determine transforms that relate Raw2D coordinate systems of image capture devices and the Home2D coordinate system.

Although the SPH calibration module 110 uses the same kinds of information as a single calibration plate based hand-eye calibration system, the SPH calibration module 110 uses a different method to determine the transforms that relate Raw2D coordinate systems and the Home2D coordinate system. In a single calibration plate based hand-eye calibration system, all physical positions of features on a calibration plate are defined in the identical Plate2D coordinate system. However, in a SPH calibration system, the physical positions of features on different calibration plates are defined in different Plate2D coordinate systems. Therefore, the SPH calibration system can transform these Plate2D coordinate systems to the Home2D coordinate system to represent all features in the same coordinate system. Such a challenge does not arise in a single calibration plate based hand-eye calibration system.

In some embodiments, the SPH calibration module 110 is configured to determine one or more of the following parameters:

Single-image capture device single-view calibration model that characterizes the non-linear transform between the Raw2D coordinate and the Camera2D coordinate system of each image capture device.

The placement pose of an image capture device: The transform between the Camera2D coordinate system and the Home2D coordinate system (e.g., Home2DFromCamera2D or Camera2DFromHome2D).

The placement pose of a calibration target: The transform between the Plate2D coordinate system and the Stage2D coordinate system (e.g., Stage2DFromPlate2D or Plate2DfromStage2D).

The transform from (1) the parameters used to control the motion rendering device, e.g., (x, y, θ) or UncorrectedHome2DFromStage2D, to (2) the actual physical pose of the stage in the home coordinate system (Home2D) (e.g., a motion correction matrix).

In some embodiments, the placement pose of an image capture device can indicate the pose of the image capture device in the system. In the stationary-image capture device configuration, the placement pose is given by Home2DFromStationary-Camera2D, which provides the pose of each stationary camera's Camera2D in Home2D. In the moving-image capture device configuration, the placement pose is given by Stage2DFromMovingCamera2D, which provides the pose of each moving image capture device's Camera2D in Stage2D. In both cases, the placement pose of an image capture device includes a 2D rigid transform and a possible handedness flip.

In some embodiments, the placement pose of the calibration target can specify the pose of the calibration target in the calibration system. In the stationary-camera configuration, the placement pose is given by Stage2DFromMovingPlate2D, which provides the pose of the moving calibration target's Plate2D in Stage2D. In the moving-camera configuration, the placement pose is given by Home2DFromStationaryPlate2D, which provides the pose of the stationary calibration target's Plate2D in Home2D. In both cases, the placement pose includes a 2D Rigid transform and a possible handedness flip.

In some embodiments, the SPH calibration module 110 can also be configured to compensate for systematic errors in the motion rendering device 114. Some lower accuracy motion rendering devices may exhibit systematic errors, such as a skew between the x motion axis and Y motion axis, a difference in the unit travel between the two axes, and/or a scale error in the unit travel from the intended nominal value. The SPH calibration module 110 can be configured to compensate for such systematic errors by compensating for the following parameters of a motion rendering device using a motion correction matrix:

The magnitude of x unit travel
The direction of the y unit travel
The magnitude of y unit travel In such embodiments, the SPH calibration module 110 may assume that the direction of the x unit travel is accurate by definition.

In some embodiments, the SPH calibration module 110 can be configured to determine these estimates based on the correspondences of features, determined in step 308, and the reported pose(s) of the motion rendering device 114.

In some embodiments, the SPH calibration module 110 assumes that, in the stationary-image capture device configuration, the calibration target is rigidly attached to the motion rendering device 114. The attachment point on the target and the orientation of the target are arbitrary. Similarly, in some embodiments, the SPH calibration module 110 assumes that, in the moving-image capture device configuration, the image capture devices are rigidly attached to the motion stage, and that the attachment point of the image capture devices and their orientations are arbitrary. In both configurations, once attached, the attachment point and the orientation should remain unchanged throughout the calibration procedure. As a result of rigidly attaching the calibration target (or image capture devices), the placement pose remains unchanged as the motion rendering device moves the calibration target or image capture devices. The placement pose includes a 2-D rigid transform and a possible handedness flip. In most applications, the placement pose cannot be precisely controlled and is unknown prior to operating the SPH calibration module 110.

In some embodiments, the SPH calibration module 110 can use a two-step approach to determine these estimates.

In the first step, the SPH calibration module 110 can construct a linear system that relates the unknown parameters, the correspondences of features, determined in step 308, and the reported poses of the motion rendering device 114. Subsequently, the SPH calibration module 110 can determine estimates of the unknown parameters by iterative solving the linear system and non-linear single camera calibration steps.

In the second step, the SPH calibration module 110 can construct a non-linear system that minimizes the feature re-projection error, and solve the non-linear system using a non-linear solver. In this second step, the solution to the linear system can be used as initial value for the non-linear solver.

First Step

Figure 4:
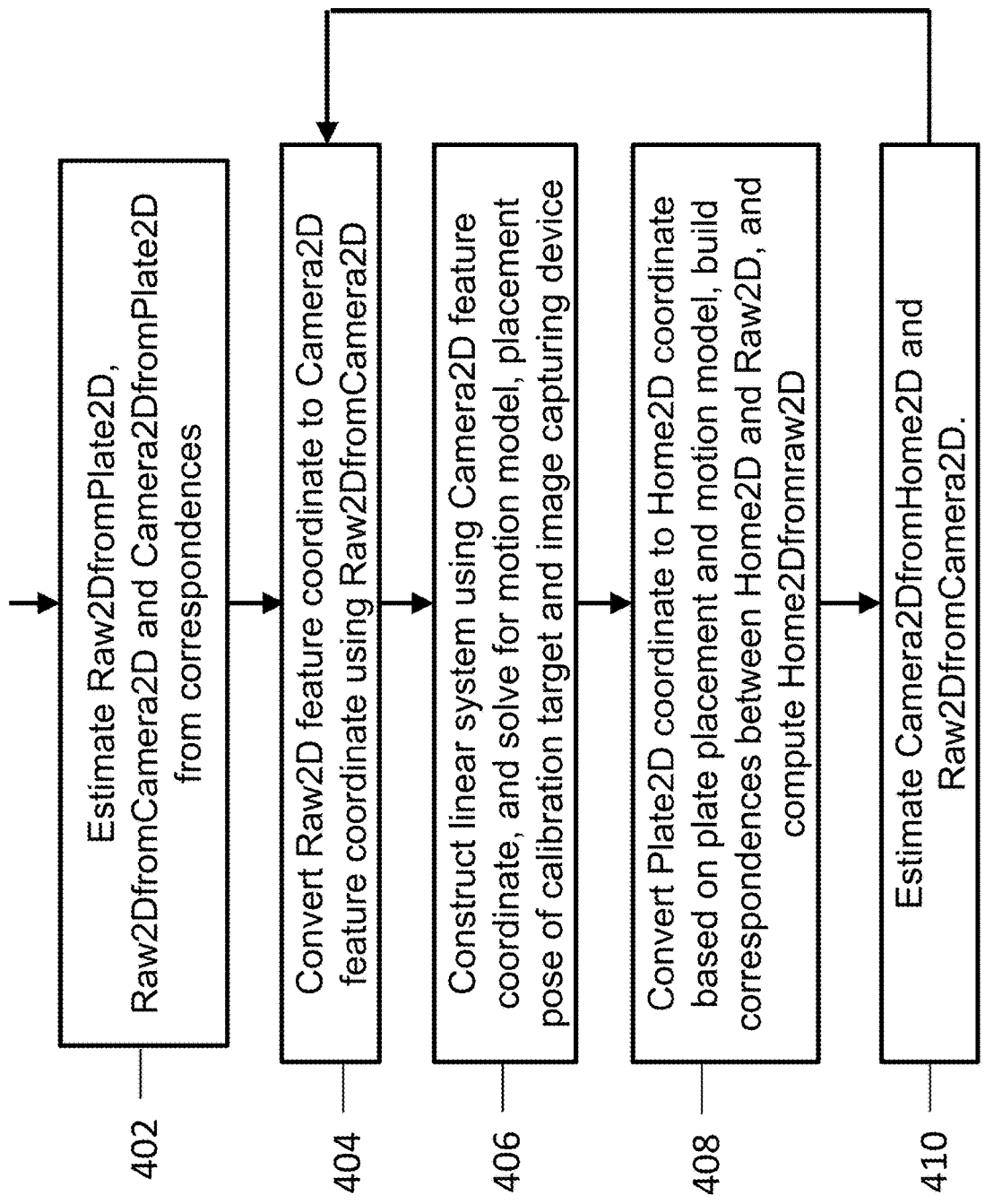
FIG. 4 illustrates a linear estimation stage of the SPH calibration module in accordance with some embodiments.

FIG. 4 illustrates a linear estimation stage of the SPH calibration module 110 in accordance with some embodiments.

In step 402, the SPH calibration module 110 can be configured to estimate Raw2DfromPlate2D, Raw2DfromCamera2D and Camera2DfromPlate2D from correspondences.

To this end, the SPH calibration module 110 can perform a single view, single image capture device calibration for each pose of the motion rendering device. The SPH calibration module 110 can use single view, single image capture device calibration techniques that are well known in the art.

In some embodiments, the SPH calibration module 110, performing the single view, single image capture device calibration, computes Camera2DFromPlate2D and Raw2DFromCamera2D based on a single image of the calibration plate. This way, the SPH calibration module 110 can resolve any handedness flip between the calibration target and the image capture device.

This single view single camera calibration assumes that both the image capture device and the calibration plate are stationary (or relatively stationary to each other). Under this assumption, the single view single camera calibration calculates the transform between the Camera2D coordinate system and the Plate2D coordinate system, and the camera's intrinsic parameters (Raw2DFromCamera2D) based on the feature correspondences (features detected on the image space Raw2D, and the corresponding feature positions on Plate2D).

Since the feature correspondences represent the transform between Raw2D and Plate2D, the SPH calibration module 110 can decompose Raw2DFromPlate2D into Raw2DFromCamera2D and Camera2DFromPlate2D. To determine Raw2DFromCamera2D and Camera2DFromPlate2D, the SPH calibration module 110 can use (1) correspondences between Raw2D feature points and Plate2D feature positions and (2) the lens distortion model type associated with the image capture device.

For this decomposition of Raw2DFromPlate2D into Raw2DFromCamera2D and Camera2DFromPlate2D, the SPH calibration module 110 assumes that Raw2DFromCamera2D and Camera2DFromPlate2D take particular forms. For example, the SPH calibration module 110 can assume that the Camea2DFromPlate2D transform is a rigid transform with a potential handedness flip when there is a mirror in the camera's optical path. Similarly, the SPH calibration module 110 can assume that Raw2DFromCamera2D indicates the perspective transform and affine transforms. The SPH calibration module 110 can also assume that Raw2DFromCamera2D includes lens distortions. In some cases, the lens distortion can be modeled as a single-parameter radial model, as follows: $Rx=x*(1+k*r^2)$; $Ry=y*(1+k*r^2)$, where $r^2=x^2+y^2$, x and y are the positions without lens distortion, and k is the coefficient of radial distortion. Because k is unknown, this coefficient is estimated through the calibration procedure. Raw2DFromCamera2D also includes the perspective transform and affine transforms.

The SPH calibration module 110 performs the single view, single image capture device calibration, by creating linear and nonlinear equations mapping Plate2D features to Raw2D features, to solve for the unknowns in Raw2DFromCamera2D and Camera2DFromPlate2D.

In some embodiments, the minimum number of correspondences that are needed to perform a single view single image capture device calibration is nine with non-degenerate location. When the number of correspondences is less than nine, but greater than two, then the SPH calibration module 110 can use a rigid plus scale and handedness linear fit to determine the Raw2DfromPlate2D including the handedness. In some embodiments, the SPH calibration module 110 can be configured to find the rigid plus scale and handedness linear fit using the least squares method. The least squares method can find the Raw2DfromPlate2D that minimizes the least squares error. In other embodiments, the SPH calibration module 110 can be configured to find the rigid plus scale and handedness linear fit using an iterative closest point method.

When there are less than three non collinear features in all the views, then the SPH calibration module 110 cannot determine the placement of the calibration plate. Therefore, in this case, the SPH calibration module 110 can throw an exception and terminate.

In step 404, the SPH calibration module 110 can convert the Raw2D feature coordinates to Camera2D feature coordinates using the inverse of Raw2DfromCamera2D determined in step 402.

In step 406, the SPH calibration module 110 can construct a linear system using features represented in the Camera2D coordinate, and solve for the motion model and the placement pose of calibration target and image capture devices.

The linear system can be constructed based on the property that for each correspondence, there are at least two ways to map the feature locations to the Home2D coordinate system.

First, the Home2D position of a feature can be calculated by applying the plate placement transform to the plate2D coordinate of the feature, which converts the Plate2D coordinate to the Stage2D coordinate. Then the motion of the motion rendering device 114 is applied and the coordinate is transformed to Home2D:

$$RP\begin{pmatrix}g\\h\\1\end{pmatrix},$$

where R refers to a motion rendering device rotation matrix that represents the rotation of the motion rendering device, P refers to a plate2D placement transform matrix that transforms the plate2D coordinate system to the Stage2D coordinate system, $$\begin{pmatrix}g\\h\\1\end{pmatrix}$$

refers to a coordinate of a feature point in the plate2D coordinate system. Second, the Home2D position of a feature can be calculated by applying the Home2DfromCamera2D transform to map the Camera2D coordinate representation of a feature to Home2D:

$$C\begin{pmatrix}p\\q\\1\end{pmatrix},$$

where C refers to a camera placement transform matrix that transforms the Camera2D coordinate system to the Home2D coordinate system, and $$\begin{pmatrix}p\\q\\1\end{pmatrix}$$

refers to a coordinate of a feature point in the Camera2D coordinate system.

As the physical location on the plate2D and the image point in Camera2D should correspond to the same location when mapped to the Home2D coordinate system, the Home2D position calculated by the two methods should be the same. However, the systematic error of the motion rendering device 114 may cause a difference in the Home2D positions calculated by the two methods. Therefore, the systematic error of the motion rendering device 114 can be compensated using a motion model. In some embodiments, the motion model can be represented as a motion correction term $$M\begin{pmatrix}x\\y\\1\end{pmatrix},$$

where M refers to a motion correction matrix and $$\begin{pmatrix}x\\y\\1\end{pmatrix}$$

refers to an uncalibrated pose of a motion rendering device.

Therefore, the relationship between Home2D positions calculated by the two methods can be expressed as a system as follows:

$$M\begin{pmatrix} x \\ y \\ 1 \end{pmatrix} + RP\begin{pmatrix} g \\ h \\ 1 \end{pmatrix} = C\begin{pmatrix} p \\ q \\ 1 \end{pmatrix}.$$

Because $$\begin{pmatrix} x \\ y \\ 1 \end{pmatrix}, \begin{pmatrix} g \\ h \\ 1 \end{pmatrix}, \begin{pmatrix} p \\ q \\ 1 \end{pmatrix}$$

and R are known values, the above-identified system is a linear system in terms of unknown M, P, and C.

In some embodiments, the motion correction matrix M can be represented as follows:

$$M = \begin{pmatrix} i & s & 0 \\ 0 & j & 0 \\ 0 & 0 & 1 \end{pmatrix}$$

where i refers to the x-scale of the motion correction matrix, j refers to the y-scale of the motion correction matrix, and s refers to the skew of the motion correction matrix.

In some embodiments, the motion rendering device rotation matrix R can be represented as follows:

$$R = \begin{pmatrix} \cos(\theta) & -\sin(\theta) & 0 \\ \sin(\theta) & \cos(\theta) & 0 \\ 0 & 0 & 1 \end{pmatrix}$$

where θ refers to the in-plane rotation of the motion rendering device 114.

In some embodiments, the plate2D placement transform matrix P can be represented as follows:

$$P = \begin{pmatrix} a & b & e \\ c & d & f \\ 0 & 0 & 1 \end{pmatrix}$$

where a, b, c, and d are plate placement rotation coefficients, and e and f are plate placement translation coefficients in the x and y axes, respectively. As discussed above, the plate2D placement transform matrix P is known to be a combination of a 2D rigid transform and the handedness transform. Therefore, the plate2D placement transform matrix P can be simplified as follows:

$$P = \begin{pmatrix} a & -b & e \\ b & a & f \\ 0 & 0 & 1 \end{pmatrix}.$$

In some embodiments, the camera placement transform matrix C can be represented as follows:

$$C = \begin{pmatrix} k & l & r \\ m & n & t \\ 0 & 0 & 1 \end{pmatrix}$$

where k, l, m, and n are camera placement rotation coefficients, and r and t are camera placement translation coefficients in the x and y axes, respectively. As discussed above, the camera placement transform matrix C is known to be a combination of a 2D rigid transform and the handedness transform. Therefore, the camera placement transform matrix C can be simplified as follows:

$$C = \begin{pmatrix} k & -l & r \\ l & k & t \\ 0 & 0 & 1 \end{pmatrix}.$$

In some embodiments, the SPH calibration module 110 can solve the linear system $$M\begin{pmatrix} x \\ y \\ 1 \end{pmatrix} + RP\begin{pmatrix} g \\ h \\ 1 \end{pmatrix} = C\begin{pmatrix} p \\ q \\ 1 \end{pmatrix}$$

with respect to the motion correction matrix M, the plate2D placement transform matrix P, and the camera placement transform matrix C, based on correspondences between physical feature locations $$\begin{pmatrix} g \\ h \\ 1 \end{pmatrix}$$

in the plate2D coordinate system and imaged feature locations $$\begin{pmatrix} p \\ q \\ 1 \end{pmatrix}$$

in the Camera2D coordinate system.

In some embodiments, the SPH calibration module 110 can be configured to determine whether the plate2D coordinate system is flipped in its handedness and whether the Camera2D coordinate system is flipped in its handedness. The plate2D placement transform matrix P and the camera placement transform matrix C, as provided above, assume that both the calibration target and the image capture device have no handedness flip. However, when the image capture device or the calibration target placement has a handedness flip, then the sign of values in the plate2D placement transform matrix P and/or the camera placement transform matrix C should be modified appropriately to account for the flipped g and h axes, and the flipped p and q axes, respectively.

For example, when both the calibration target and the image capture device have no handedness flip, then the plate2D placement transform matrix P and the camera placement transform matrix C can be provided as follows:

$$P = \begin{pmatrix} a & -b & e \\ b & a & f \\ 0 & 0 & 1 \end{pmatrix}, C = \begin{pmatrix} k & -l & r \\ l & k & t \\ 0 & 0 & 1 \end{pmatrix}.$$

As another example, when the calibration target has a handedness flip, but the image capture device does not have a handedness flip, then the plate2D placement transform matrix P and the camera placement transform matrix C can be provided as follows:

$$P = \begin{pmatrix} a & b & e \\ b & -a & f \\ 0 & 0 & 1 \end{pmatrix}, C = \begin{pmatrix} k & -l & r \\ l & k & t \\ 0 & 0 & 1 \end{pmatrix}.$$

As another example, when the calibration target does not have a handedness flip, but the image capture device has a handedness flip, then the plate2D placement transform matrix P and the camera placement transform matrix C can be provided as follows:

$$P = \begin{pmatrix} a & -b & e \\ b & a & f \\ 0 & 0 & 1 \end{pmatrix}, C = \begin{pmatrix} k & l & r \\ l & -k & t \\ 0 & 0 & 1 \end{pmatrix}.$$

As another example, when both the calibration target and the image capture device have a handedness flip, then the plate2D placement transform matrix P and the camera placement transform matrix C can be provided as follows:

$$P = \begin{pmatrix} a & b & e \\ b & -a & f \\ 0 & 0 & 1 \end{pmatrix}, C = \begin{pmatrix} k & l & r \\ l & -k & t \\ 0 & 0 & 1 \end{pmatrix}.$$

If the SPH calibration module 110 does not have any information on whether the plate2D coordinate system is flipped in its handedness or whether the Camera2D coordinate system is flipped in its handedness, then the SPH calibration module 110 has to test all four cases provided above to determine a solution to the constructed linear system.

However, in some embodiments, the SPH calibration module 110 can limit the number of test cases because the SPH calibration module 110 can determine whether there is handedness flip between the plate2D and the raw2D by examining the raw2DfromPlate2D transform.

In some embodiments, the SPH calibration module 110 can be configured to determine whether there is handedness flip between the plate2D and the raw2D by examining the raw2DfromPlate2D transform. For example, the SPH calibration module 110 can be configured to determine whether there is handedness flip by linearizing Raw2DfromPlate2D at the center of the image and checking the determinant. When the determinant is positive, then the SPH calibration module 110 can determine that there is no handedness flip.

Therefore, when the raw2DfromPlate2D transform indicates that there is a handedness flip between the plate2D and the raw2D, then the SPH calibration module 110 knows that the combination of P and C can only be one of the following two options:

$$P = \begin{pmatrix} a & b & e \\ b & -a & f \\ 0 & 0 & 1 \end{pmatrix}, C = \begin{pmatrix} k & -l & r \\ l & k & t \\ 0 & 0 & 1 \end{pmatrix} \text{ or }$$

$$P = \begin{pmatrix} a & -b & e \\ b & a & f \\ 0 & 0 & 1 \end{pmatrix}, C = \begin{pmatrix} k & l & r \\ l & -k & t \\ 0 & 0 & 1 \end{pmatrix}.$$

Similarly, when the raw2DfromPlate2D transform indicates that there is no handedness flip between the plate2D and the raw2D, then the SPH calibration module 110 knows that the combination of P and C can only be one of the following two options:

$$P = \begin{pmatrix} a & -b & e \\ b & a & f \\ 0 & 0 & 1 \end{pmatrix}, C = \begin{pmatrix} k & -l & r \\ l & k & t \\ 0 & 0 & 1 \end{pmatrix} \text{ or }$$

$$P = \begin{pmatrix} a & b & e \\ b & -a & f \\ 0 & 0 & 1 \end{pmatrix}, C = \begin{pmatrix} k & l & r \\ l & -k & t \\ 0 & 0 & 1 \end{pmatrix}.$$

Once the SPH calibration module 110 determines that the handedness of plate2D is flipped, then the SPH calibration module 110 can examine the raw2DfromPlate2D transform to determine whether the raw2D is also flipped.

In some embodiments, the SPH calibration module 110 can be configured to determine which one of the two options is correct by (1) estimating M, P, and C from the linear system $$M \begin{pmatrix} x \\ y \\ 1 \end{pmatrix} + RP \begin{pmatrix} g \\ h \\ 1 \end{pmatrix} = C \begin{pmatrix} p \\ q \\ 1 \end{pmatrix}$$

for both options, and (2) examining the difference between $$M \begin{pmatrix} x \\ y \\ 1 \end{pmatrix} + RP \begin{pmatrix} g \\ h \\ 1 \end{pmatrix} \text{ and } C \begin{pmatrix} p \\ q \\ 1 \end{pmatrix}$$

based on the estimated M, P, and C for both options. The SPH calibration module 110 can also determine the positive definiteness of the motion correction matrix M. The SPH calibration module 110 is configured to determine that the option with (1) the smaller difference and (2) the more positive definite motion correction matrix M is the correct option.

In step 408, once the SPH calibration module 110 estimates M, P, and C, the SPH calibration module 110 can combine correspondences under different poses for one image capture device 102. For example, the SPH calibration module 110 can convert the features in the Plate2D coordinate system to the Home2D coordinate system based on the estimated M and P. Therefore, correspondences under different poses for one image capture device 102 can be combined in the Home2D coordinate system.

In step 410, the SPH calibration module 110 can operate a single view single image capture device calibration on the combined correspondences. This way, the SPH calibration module 110 can determine Camera2DFromHome2D and Raw2DfromCamera2D based on correspondences from all poses. As the Raw2DfromCamera2D transform used in the beginning of first iteration are not computed from all the poses, its accuracy might get improved through the first iteration. In the subsequent iterations, a more accurate Raw2DfromCamera2D transform will further improve the result accuracy. The iteration will terminate when reach preset maximum iterations.

Second Step

The first step of the SPH calibration mechanism can generally provide a coarse solution that is close to the ground truth, but may still need further refinement to improve accuracy. To refine the initial result from the first step, the SPH calibration module 110 can be configured to perform a nonlinear optimization to minimize the "re-projection error", where the result returned from the first step is used as an initial value. The second step can be expressed as follows:

$$C_{result} = \underset{C}{\operatorname{argmin}}(E((p, q), T(C, x, y, \theta, g, h, \ldots )))$$

where $(x, y, \theta)$ is the uncorrected pose of the motion rendering device 114, $((g, h), (p, q))$ are the Plate2D coordinate and the Raw2D coordinate of the features. $C_{result}$ is the hand eye calibration result that needs to be solved, which includes the image capture device's intrinsic and extrinsic parameters, the amount of lens distortion associated with the image capture device, the motion correction transform, and the calibration target placement. C is one intermediate calibration result in the nonlinear optimization. Using C, a physical point can be mapped to Raw2D. $T(C,x,y,\theta,g,h, \ldots )$ can be represented as:

$T(C,x,y,\theta,g,h, \ldots )=$
Raw2DFromCamera2D*Camera2D
fromHome2D*Home2DFromStage2D*
Stage2DFromPlate2D*(g,h).

In some embodiments, the energy function $E(\varphi,\Omega)$ can compute the Euclidean distance between the two input arguments $\varphi,\Omega: E(\varphi,\Omega)=\|\varphi-\Omega\|$.

In some embodiments, the SPH calibration module 110 can be configured to solve the above-identified non-linear system using a nonlinear technique such as a Levenberg-Marquardt (LM) optimization technique. For example, the SPH calibration module 110 can set up the initial solution vector as the linear solution from the first step of SPH calibration mechanism. The object function is designed to calculate the re-projection error between the Raw2D and mapped Raw2D using the currently hand-eye calibration result. This re-projection error can be calculated by calculating the distance between the Raw2D and the mapped Raw2D.

Subsequently, the SPH calibration module 110 computes the Jacobian matrix using a numerical method. After Jacobian matrix is calculated, the SPH calibration module 110 updates the solution of the non-linear system, calculates the residual, and continually iterates till default stop criteria is satisfied. The default stop criteria can include, for example, that the number of iteration is a predetermined number, or that the residual is less that a predetermined threshold. Once the SPH calibration module 110 completes the iterations, the resulting vector can include the image capture device's image capture device's intrinsic and extrinsic parameters, the amount of lens distortion associated with the image capture device, the motion correction transform, and the calibration target placement.

TFH Calibration System

The TFH calibration system can be used in applications where a runtime object—an object being analyzed by the machine vision system—has sufficient features that could be used as a calibration pattern. For example, when the runtime object has a large number of corners, edges, or any identifiable features, these features can be used to perform hand-eye calibration using the TFH calibration system.

One of the challenges with using a runtime object as a calibration target is often that physical locations of calibration features on the runtime object are unknown. Therefore, the TFH calibration system should be configured to (1) detect and track the calibration features on the runtime object across the motion rendering device poses, (2) estimate the unknown physical locations of the detected calibration features, and (3) estimate hand-eye calibration parameters.

In some embodiments, the TFH calibration system can operate in a stationary image capture device configuration. In this configuration, image capture devices can be stationary, and the motion rendering device can carry the runtime object through a variety of predetermined poses. In other embodiments, the TFH calibration system can operate in a moving image capture device configuration. In this configuration, the runtime object can remain stationary, and the motion rendering device can carry the image capture devices through a variety of predetermined poses.

In some embodiments, the TFH calibration system can associate (1) images of the calibration target captured by a plurality of image capture devices and (2) the poses of the motion rendering device under which the images were taken, and store the images and the associated poses in an image database.

In some embodiments, the TFH calibration system can be configured to perform TFH calibration on images stored in the image database. The TFH calibration system can operate one or more feature trackers to detect and track features that can be used as calibration features. The feature tracker can include a corner detector, an edge detector, a scale-invariant feature transform (SIFT) detector, and/or any other detectors that are capable of detecting reliable features suitable for calibration purposes. These calibration features are represented in the Raw2D coordinate system, and hence also referred to as the tracked Raw2D features. The TFH calibration system subsequently uses the tracked Raw2D features to perform hand-eye calibration.

Figure 5:
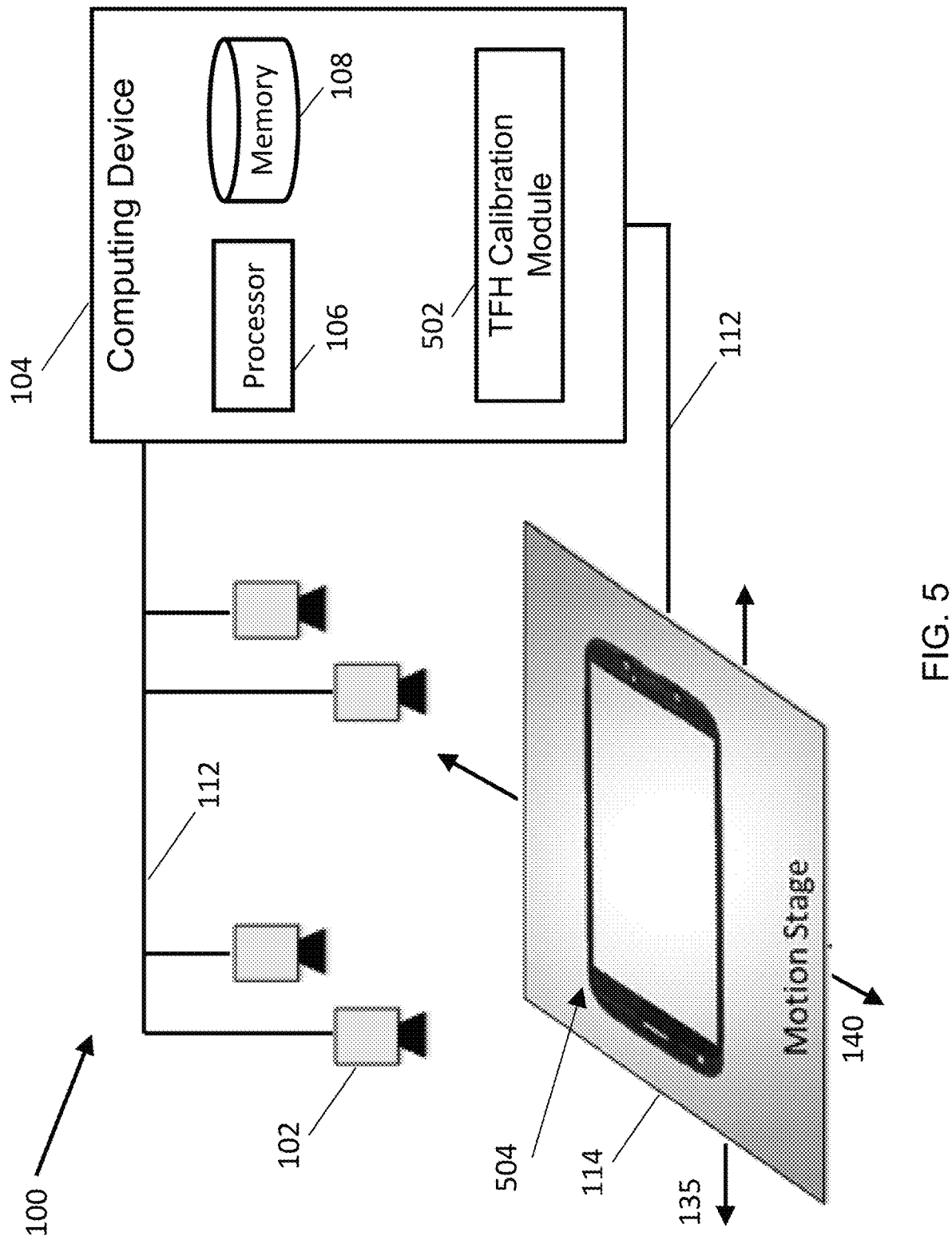
FIG. 5 illustrates a tracked feature-based hand-eye (TFH) calibration system in accordance with some embodiments.

FIG. 5 illustrates a TFH calibration system in accordance with some embodiments. FIG. 5 includes many identical components as FIG. 1. However, in the tracked feature hand-eye calibration system, the computing device 104 includes a TFH calibration module 502, and the motion rendering device 114 is configured to carry a runtime object 504 that is being examined by the machine vision system 100.

In some embodiments, the TFH calibration module 502 can be configured to coordinate the TFH calibration mechanism. The TFH calibration module 502 can be configured to send, via the one or more interfaces to the motion rendering device, first data configured to cause the motion rendering device to move to a requested first pose, receive, via the one or more interfaces from the motion rendering device, a reported first pose, receive, via the one or more interfaces from the first image sensor, a first image of the first subset of the plurality of features for the reported first pose, and receive, via the one or more interfaces from the second image sensor, a second image of the second subset of the plurality of features for the reported first pose. The TFH calibration module 502 can also be configured to determine a first transform between the first coordinate system and the second coordinate system based, at least in part, on the first subset of the plurality of features and the reported first pose, and determine a second transform between the first coordinate system and the third coordinate system based, at least in part, on the second subset of the plurality of features and the reported first pose.

In some embodiments, the TFH calibration module 502 can determine the first transform and the second transform in a two-step process. In the first step, the TFH calibration module 502 can construct a linear system that relates the unknown parameters, the location of features in captured images, and a reported pose of the motion rendering device 114. Subsequently, the TFH calibration module 502 can determine estimates of the unknown parameters by iterative solving the linear system and non-linear single camera calibration steps. In the second step, the TFH calibration module 502 can construct a non-linear system that minimizes the feature re-projection error, and solve the non-linear system using a non-linear solver. In this second step, the solution of the linear system can be used as initial value for the non-linear solver.

In some embodiments, the TFH calibration module 502 can be implemented in digital electronic circuitry, or in computer hardware, firmware, software, or in combinations of them. The implementation can be as a computer program product, e.g., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

In some embodiments, the SPH calibration module 110 and the TFH calibration module 502 can reside in the same computing device 104. In some embodiments, the SPH calibration module 110 and the TFH calibration module 502 can be implemented on the same integrated circuit, such as ASIC, PLA, DSP, or FPGA, thereby forming a system on chip. Subroutines can refer to portions of the computer program and/or the processor/special circuitry that implement one or more functions.

In other embodiments, the SPH calibration module 110 and the TFH calibration module 502 can reside in different computing devices.

Figure 6:
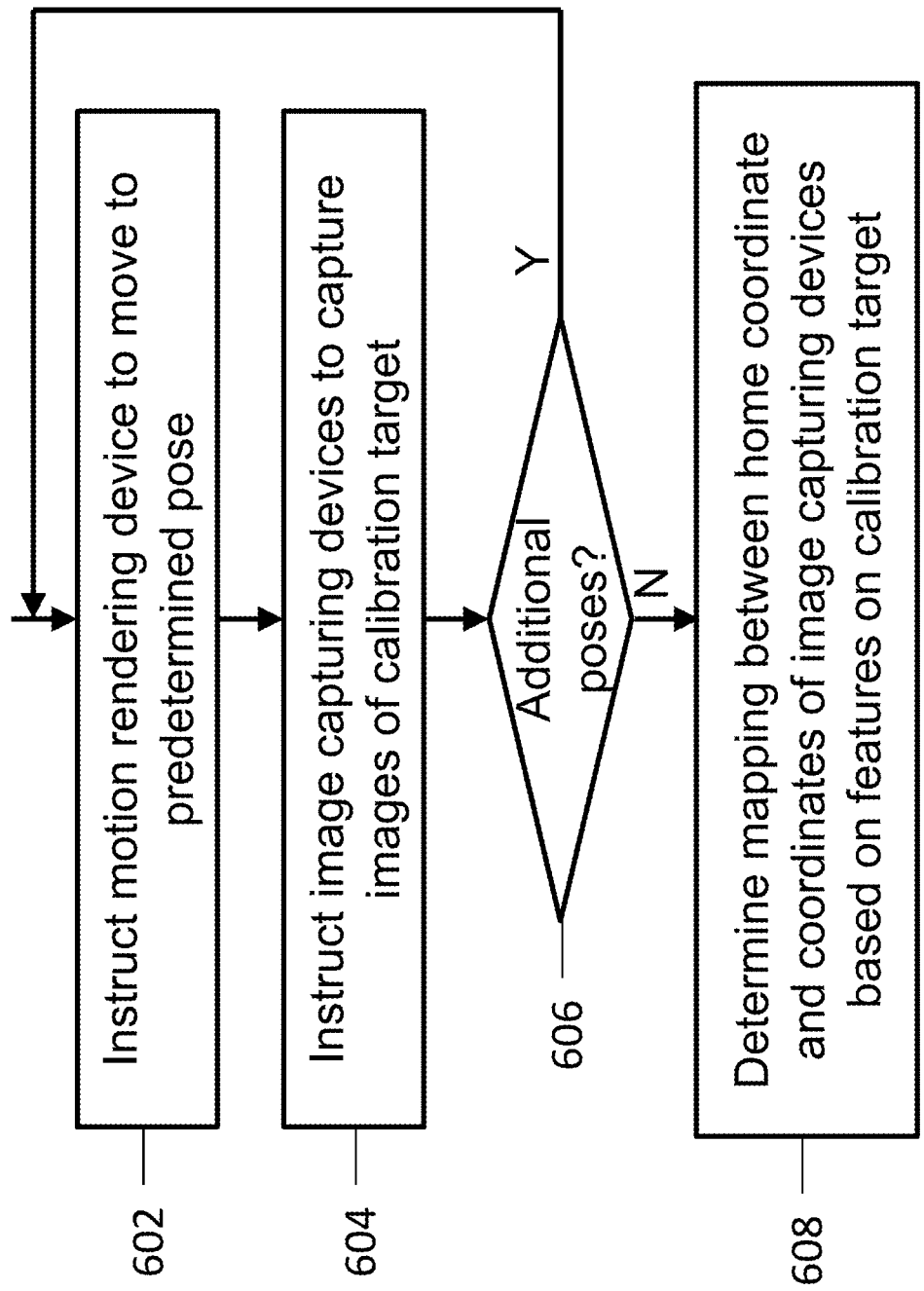
FIG. 6 illustrates an operation of a TFH calibration module in a TFH calibration system in accordance with some embodiments.

FIG. 6 illustrates an operation of a TFH calibration module in a TFH calibration system in accordance with some embodiments.

The TFH calibration module 502 can be configured to determine a relationship between coordinate systems of one or more image capture devices 102 (e.g., Raw2D) and a coordinate system of a motion rendering device (e.g., Stage2D). To this end, the TFH calibration module 502 is configured to establish a correspondence between Raw2D features found in images taken by the image capture devices 102 to the physical Stage2D coordinates of these features as the motion rendering device 114 moves through a known set of poses.

In some embodiments, the motion rendering device 114 carries the runtime object 504. In such embodiments, the TFH calibration system is said to operate in a stationary-image capture device configuration. In some embodiments, the motion rendering device 114 carries the image capture devices 102. In such embodiments, the TFH calibration system is said to operate in a moving-image capture device configuration.

In step 602, the TFH calibration module 502 is configured to instruct a motion rendering device 114 to move to a predetermined pose. Once the motion rendering device 114 receives the instruction, the motion rendering device 114 moves to the predetermined pose, and reports back, to the TFH calibration module 502, a reported pose of the motion rendering device 114. The actual pose of the motion rendering device 114 may be different from the reported and the commanded pose instructed by the TFH calibration module 502 due to the limited accuracy of the motion rendering device 114.

In step 604, the TFH calibration module 502 is configured to instruct image capture devices 102 to capture images of the runtime object 504. Once the image capture devices 102 receive the instruction, each image capture device 102 can capture an image of the runtime object 504 and transmit the captured image to the TFH calibration module 502.

In step 606, the TFH calibration module 502 is configured to determine whether there are additional poses at which images of the runtime object 504 should be captured. When there are additional poses at which images of the runtime object 504 should be captured, the TFH calibration module 502 can go to step 602. When there are no additional poses at which images of the runtime object 504 should be captured, then the TFH calibration module 502 can go to step 608.

In step 608, the TFH calibration module 502 is configured to determine transforms that relate Raw2D coordinate systems of image capture devices and the Home2D coordinate system based on calibration features extracted from images of the runtime object 504.

In some embodiments, the TFH calibration module 502 can also be configured to compensate for systematic errors in the motion rendering device 114. Some lower accuracy motion rendering devices may exhibit systematic errors, such as a skew between the x motion axis and Y motion axis, a difference in the unit travel between the two axes, and/or a scale error in the unit travel from the intended nominal value. The TFH calibration module 502 can be configured to compensate for such systematic errors by estimating the following parameters of a motion rendering device:

The direction of the y unit travel

The magnitude of y unit travel

In such embodiments, the TFH calibration module 502 may assume that the direction of the x travel and the x unit size is accurate by definition.

In some embodiments, the TFH calibration module 502 can be configured to determine these estimates based on Raw2D feature locations extracted from images of the runtime object 504 and the reported poses of the motion rendering device 114.

In some embodiments, the TFH calibration module 502 assumes that, in the stationary-image capture device configuration, the runtime object 504 is rigidly attached to the motion rendering device 114. The attachment point of the runtime object 504 and the orientation of the runtime object 504 are arbitrary. Similarly, in some embodiments, the TFH calibration module 502 assumes that, in the moving-image capture device configuration, the image capture devices are rigidly attached to the motion stage, and that the attachment point of the image capture devices and their orientations are arbitrary. In both configurations, once attached, the attachment point and the orientation should remain unchanged throughout the calibration procedure.

As a result of rigidly attaching the runtime object 504 or image capture devices 102, the placement pose remains unchanged as the motion rendering device moves the calibration target or image capture devices. The placement pose includes a 2-D rigid transform and a possible handedness flip. In most applications, the placement pose cannot be precisely controlled and is unknown prior to operating the TFH calibration module 502.

In some embodiments, the TFH calibration module 502 can use a two-step approach to determine these estimates.

In the first step, the TFH calibration module 502 can construct a linear system that relates the unknown parameters, Raw2D locations of calibration features on the runtime object 504, and the reported poses of the motion rendering device 114. Subsequently, the TFH calibration module 502 can determine estimates of the unknown parameters by iterative solving the linear system and non-linear single camera calibration steps.

In the second step, the TFH calibration module 502 can construct a non-linear system that minimizes the feature re-projection error, and solve the non-linear system using a non-linear solver. In this second step, the solution to the linear system can be used as initial value for the non-linear solver. This second step of the TFH calibration module 502 is identical to the second step of the SPH calibration module 110.

First Step

As discussed with respect to the first step of the SPH calibration module 110, as the physical location of features on the Stage2D coordinate system and the image point in the Camera2D coordinate system should correspond to the same location when mapped to the Home2D coordinate system, the Home2D position calculated by the two methods should be the same. This relationship can be expressed as the following system:

$$M\begin{pmatrix} x \\ y \\ 1 \end{pmatrix} + RP\begin{pmatrix} g \\ h \\ 1 \end{pmatrix} = C\begin{pmatrix} p \\ q \\ 1 \end{pmatrix}$$

where M refers to a motion correction matrix, $$\begin{pmatrix} x \\ y \\ 1 \end{pmatrix}$$

refers to an uncalibrated pose of a motion rendering device, R refers to a motion rendering device rotation matrix that represents the rotation of the motion rendering device in the Home2D coordinate system, P refers to a Part2D placement transform matrix that transforms the Part2D coordinate system to the Home2D coordinate system, $$\begin{pmatrix} g \\ h \\ 1 \end{pmatrix}$$

refers to a coordinate of a feature point in the Part2D coordinate system, C refers to a camera placement transform matrix that transforms the Camera2D coordinate system to the Home2D coordinate system, and $$\begin{pmatrix} p \\ q \\ 1 \end{pmatrix}$$

refers to a coordinate of a feature point in the Camera2D coordinate system.

In the case of SPH calibration, the above-identified system was a linear system in terms of unknown M, P, and C because $$\begin{pmatrix} x \\ y \\ 1 \end{pmatrix}, \begin{pmatrix} g \\ h \\ 1 \end{pmatrix}, \begin{pmatrix} p \\ q \\ 1 \end{pmatrix}$$

and R are known values. However, in the case of TFH calibration, the TFH calibration module 502 does not know the Part2D coordinate of extracted features:

$$\begin{pmatrix} g \\ h \\ 1 \end{pmatrix}.$$

Therefore, the above-identified system is no longer linear in terms of unknown variables: M, P, C, and $$\begin{pmatrix} g \\ h \\ 1 \end{pmatrix}.$$

To ensure that the above-identified system is a linear system in terms of unknown variables, the TFH calibration module 502 can assume, without loss of generality, that the Part2D placement transform matrix P is an identity matrix. In other words, regardless of the in-plane rotation of the runtime object 504, the calibration features are measured in Stage2D.

Based on this assumption, the above-identified system can be rewritten as follows:

$$M\begin{pmatrix} x \\ y \\ 1 \end{pmatrix} + R\begin{pmatrix} g \\ h \\ 1 \end{pmatrix} = C\begin{pmatrix} p \\ q \\ 1 \end{pmatrix}$$

In some embodiments, there are only 2 possible handedness flips. There is no handedness flip between Part2D and Stage2D because Stage2DFromPart2D is identity. In case the image capture device's placement does not have a handedness flip, then $$C = \begin{pmatrix} k & -l & r \\ l & k & t \\ 0 & 0 & 1 \end{pmatrix}.$$

In case the image capture device's placement does have a handedness flip, then $$C = \begin{pmatrix} k & l & r \\ l & -k & t \\ 0 & 0 & 1 \end{pmatrix}.$$

By solving the above-identified linear system, the TFH calibration module 502 can estimate the image capture device placement, motion model and the estimated feature location in Stage2D.

Figure 7:
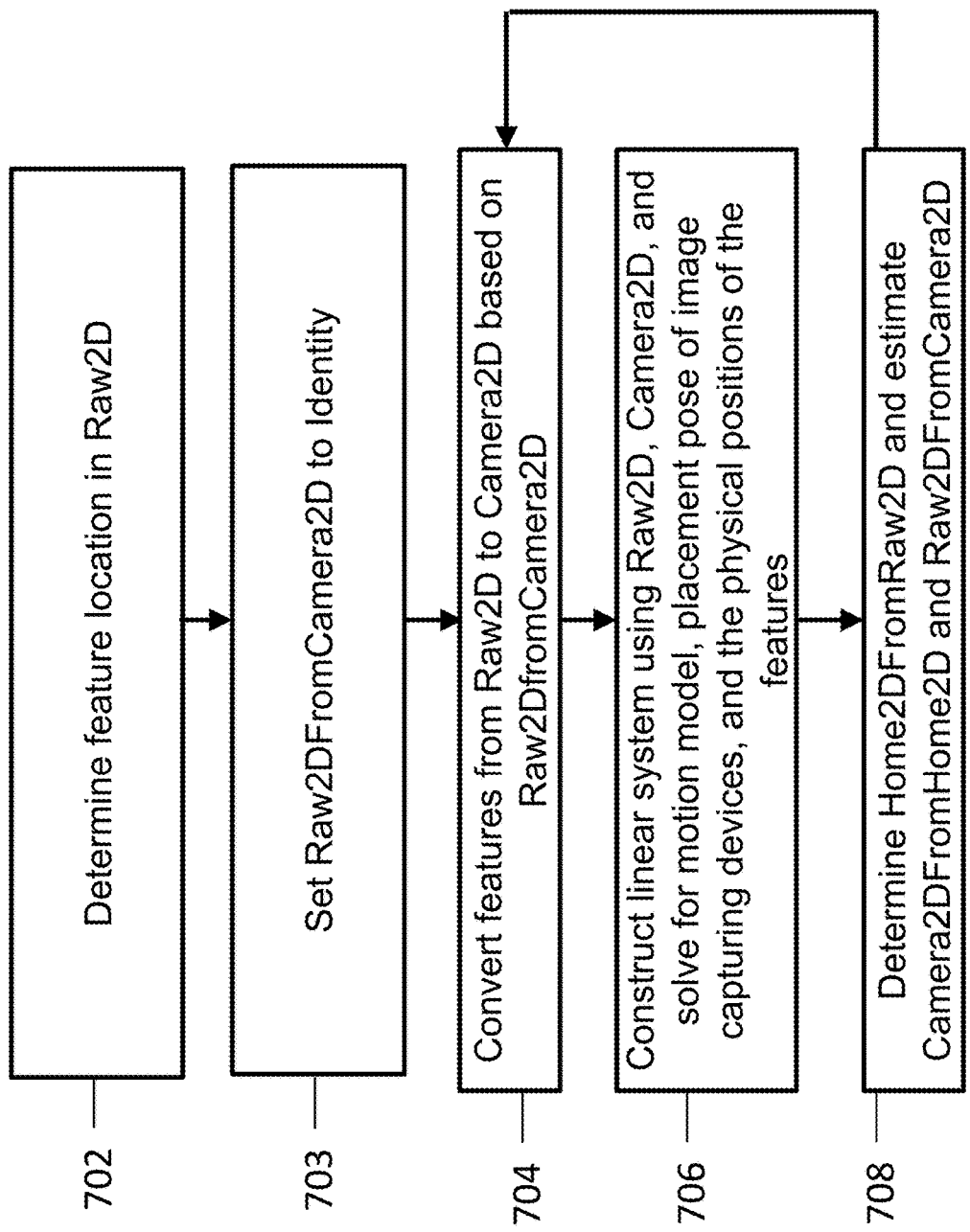
FIG. 7 illustrates a linear estimation stage of the TFH calibration module in accordance with some embodiments.

FIG. 7 summarizes a linear estimation stage of the TFH calibration module 502 in accordance with some embodiments.

In step 702, the TFH calibration module 502 can determine the locations of calibration features on the calibration target in the Raw2D coordinate system. To this end, the TFH calibration module 502 can operate a feature tracker on images of the calibration target taken by a plurality of image capture devices 102 under one or more poses of the motion rendering device 114. The feature tracker can include a corner detector, an edge detector, a scale-invariant feature transform (SIFT) detector, and/or any other detectors that are capable of detecting reliable features suitable for calibration purposes.

In step 703, the TFH calibration module 502 can set Raw2DFromCamera2D to an identity transform.

In step 704, the TFH calibration module 502 can transform the Raw2D feature locations to the Camera2D feature locations $$\begin{pmatrix} p \\ q \\ 1 \end{pmatrix}$$

using the Raw2DfromCamera2D transform.

In step 706, the TFH calibration module 502 can set up the linear system $$M \begin{pmatrix} x \\ y \\ 1 \end{pmatrix} + R \begin{pmatrix} g \\ h \\ 1 \end{pmatrix} = C \begin{pmatrix} p \\ q \\ 1 \end{pmatrix},$$

and estimate M, C, and (g,h) from the linear system.

In step 708, the TFH calibration module 502 can convert all Stage2D feature locations to Home2D locations as follows:

$$M \begin{pmatrix} x \\ y \\ 1 \end{pmatrix} + R \begin{pmatrix} g \\ h \\ 1 \end{pmatrix}.$$

Subsequently, the TFH calibration module 502 can build correspondences between the Home2D feature locations and the Raw2D feature locations. Based on these correspondences, the TFH calibration module 502 can determine the Home2DfromRaw2D transform. Also based on the relationship between the Home2D feature locations and the Camera2D feature locations $$\begin{pmatrix} p \\ q \\ 1 \end{pmatrix},$$

the TFH calibration module 502 can estimate the Camera2DfromHome2D transform.

Furthermore, in some embodiments, the TFH calibration module 502 can re-estimate the Raw2DfromCamera2D transform by iterating steps 704-708 until the stop criterion is satisfied. The stop criterion can include reaching the maximum number of iterations. This re-estimation process is similar to the iteration process described with respect to the SPH calibration module 110.

In some embodiments, the Camera 2D coordinate system is an intermediate coordinate system, and its unit size (e.g., scale factor) is define to be the same as that of the Home2D coordinate system. This means that, when the TFH calibration module 502 decomposes the Raw2DFromHome2D into Raw2DFromCamera2D and Camera2DFromHome2D, the TFH calibration module 502 would allocate the scale factor in Raw2DFromCamera2D, and allocate all translation factors in Home2DFromCamera2D. Or, alternatively, all the scale and translation can be factored into HOme2DFromCamera2D, leaving Raw2DFromCamera2D as Identity. However, this may not be the most accurate decomposition. But before physical position of the features on Stage2D can be solved, there won't be any information about Raw2DFromHome2D. Therefore, the TFH calibration module 502 can iterate steps 702-708 to iteratively solve for either one of Raw2DFromCamera2D or Camera2DFromHome2D while fixing the other.

For example, in the first iteration, the TFH calibration module 502 can initialize Raw2DFromCamera2D as Identity, and solve for Camera2DFromHome2D and other parameters/transforms. As the Raw2DFromCamera2D being used for solving Camera2DFromHome2D is Identity, the actual scale and translation of Raw2DFromCamera2D are factored into Camera2DFromHome2D. However, by definition, the scale of Camera2DFromHome2D should be one, thus the scale factor can be computed and used to convert the computed motion model (e.g., a motion correction term that is represented using a motion correction matrix), placement pose of image capturing devices, and the physical positions of the features in step 706 to correct scale. Then in step 708, the Raw2DFromCamera2D can be computed to replace the initial Identity transform. In the second iteration, the TFH calibration module 502 can use the more accurate Raw2DFromCamera2D to solve for motion correction model, placement pose of image capturing devices, and the physical positions of the features, and then update the Raw2DFromCamera2D with more accurate physical positions of the features. This iterative process improves the accuracy of this decomposition.

Therefore, after calculating the new Raw2DfromCamera2D, the TFH calibration module 502 can iterate steps 704-708 until the TFH calibration module 502 reaches the maximum iteration number. The iteration of steps 704-708 can reduce the approximation error that results from approximating a nonlinear relationship (e.g., lens distortion) as a linear system.

During the first iteration, the scale ambiguity between Raw2D and Home2D can be resolved. In most of the cases, after the second iteration, the TFH calibration module 502 should be able to provide a relatively accurate estimate. In some embodiments, the maximum iteration number can be set to 4, as accuracy is not the priority concern in the first step of the disclosed TFH calibration mechanism.

Second Step

The first step of the TFH calibration mechanism generally provides a coarse solution that is close to the ground truth, but may still need further refinement to improve accuracy. To refine the initial result from the first step, the TFH calibration module 502 can be configured to perform a nonlinear optimization to minimize the "re-projection error", where the result returned from the first step is used as an initial value. The nonlinear optimization performed by the TFH calibration module 502 can be substantially identical to the nonlinear optimization performed by the SPH calibration module 110. One difference is that, in the case of TFH calibration, physical feature locations in Stage2D are unknown. Therefore, the TFH calibration module 502 can be configured to iteratively estimate the physical feature locations in Stage2D in the nonlinear estimation, using the estimated physical feature locations in Stage2D from the first step as the initial value. The physical feature locations in Stage2D are refined in the LM solver.

Recalibration

Due to different characteristic of hand-eye calibration methods, different hand-eye calibration methods can be used in different scenarios. For example, the image capture devices are usually pre-calibrated in factory using a big calibration plate which provides high calibration accuracy. However, when the motion rendering device and the image capture devices are deployed for an application, the motion rendering device and the image capture devices still needs to be periodically calibrated to compensate for changes in the physical settings. For example, certain pre-calibrated parameters, such as the extrinsic parameter of an image capture device, may change over time due to vibrations of the motion rendering device, and may need to be re-calibrated periodically to compensate for such changes. For such periodic calibration applications, the SPH calibration mechanism and the TFH calibration mechanism can be useful.

As discussed above, the SPH calibration mechanism and the TFH calibration mechanism can provide limited accuracy, especially when there are only few features or motion poses in the presence of lens distortions. However, when a highly accurate calibration result from a previously-performed calibration is available, the concept of recalibration can be used to improve the accuracy of the SPH calibration mechanism and the TFH calibration mechanism by using the highly accurate previously performed camera calibration.

For example, certain calibration parameters, such as the intrinsic parameters of an image capture device, may not change even in the presence of vibrations of the motion rendering device provided that the image capture device or its lenses have not been reassembled. Therefore, the recalibration scheme can retain the intrinsic parameters of an image capture device and calibrate only the extrinsic parameters of the image capture device. Recalibration scheme can be substantially similar to the full calibration schemes. However, the recalibration scheme can use an additional input vector containing the calibration parameters of the image capture device. The recalibration scheme is not only faster, but is also more accurate compared to full hand-eye calibration without prior information about the intrinsic parameters of an image capture device, especially for the TFH calibration mechanism.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and apparatus for carrying out the several purposes of the disclosed subject matter. It is important, therefore, that the claims be regarded as including such equivalent constructions insofar as they do not depart from the spirit and scope of the disclosed subject matter. For example, some of the disclosed embodiments relate one or more variables. This relationship may be expressed using a mathematical equation. However, one of ordinary skill in the art may also express the same relationship between the one or more variables using a different mathematical equation by transforming the disclosed mathematical equation. It is important that the claims be regarded as including such equivalent relationships between the one or more variables.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A machine vision system comprising:
   one or more interfaces configured to provide communication with a motion rendering device, a first image sensor, and a second image sensor, wherein:
   the motion rendering device is configured to provide at least one of a translational movement and an in-plane rotational movement, and is associated with a first coordinate system;
   the motion rendering device is configured to directly or indirectly carry a first calibration plate and a second calibration plate, and the first calibration plate and the second calibration plate comprise a first plurality of known features with known physical positions relative to the first calibration plate and a second plurality of known features with known physical positions relative to the second calibration plate, respectively; and
   the first image sensor and the second image sensor are configured to capture an image of the first calibration plate and the second calibration plate, respectively, and the first image sensor and the second image sensor are associated with a second coordinate system and a third coordinate system, respectively, wherein each of the first coordinate system, second coordinate system, and third coordinate system are different from each other; and
   a processor configured to run a computer program stored in memory that is configured to:

send, via the one or more interfaces to the motion rendering device, first data configured to cause the motion rendering device to move to a requested first pose;
receive, via the one or more interfaces from the motion rendering device, a reported first pose;
receive, via the one or more interfaces from the first image sensor, a first image of the first calibration plate for the reported first pose;
receive, via the one or more interfaces from the second image sensor, a second image of the second calibration plate for the reported first pose;
determine a first plurality of correspondences between the known physical positions of the first plurality of features relative to the first calibration plate and first positions of the first plurality of features detected in the first image;
determine a second plurality of correspondences between the known physical positions of the second plurality of features relative to the second calibration plate and second positions of the second plurality of features detected in the second image;
determine, based on the first plurality of correspondences, a first transformation that allows mapping between the first coordinate system associated with the motion rendering device and the second coordinate system associated with the first image sensor; and
determine, based on the second plurality of correspondences, a second transformation that allows mapping between the first coordinate system associated with the motion rendering device and the third coordinate system associated with the second image sensor,
wherein the first and second transformations allow the machine vision system to establish correspondences between features found in separate images taken by the first and second image sensors and the first coordinate system.

2. The machine vision system of claim 1, wherein the computer program is operable
to cause the processor to determine a motion correction transform that compensates for a systematic motion error associated with the motion rendering device.

3. The machine vision system of claim 1, wherein the computer program is operable to cause the processor to re-calibrate the machine vision system after a first period of time, comprising re-determining:
the first plurality of correspondences;
the second plurality of correspondences;
the first transformation; and
the second transformation.

4. The machine vision system of claim 3, wherein re-calibrating the machine vision
system comprises adjusting one or more pre-calibrated parameters.

5. A machine vision system comprising:
one or more interfaces configured to provide communication with a motion rendering device, a first image sensor, and a second image sensor, wherein:
the motion rendering device is configured to provide at least one of a translational movement and an in-plane rotational movement, and is associated with a first coordinate system;
the motion rendering device is further configured to directly or indirectly carry a first calibration plate and a second calibration plate;
the first image sensor and the second image sensor are configured to capture an image of the first calibration plate and the second calibration plate, respectively;
the first image sensor and the second image sensor are associated with a second coordinate system and a third coordinate system, respectively, wherein each of the first coordinate system, second coordinate system, and third coordinate system are different from each other; and
the first calibration plate and the second calibration plate comprise a first plurality of known features with known physical positions relative to the first calibration plate and a second plurality of known features with known physical positions relative to the second calibration plate, respectively; and
a processor configured to run a computer program stored in memory configured to:
send, via the one or more interfaces to the motion rendering device, first data configured to cause the motion rendering device to move to a requested first pose;
receive, via the one or more interfaces from the motion rendering device, a reported first pose;
receive, via the one or more interfaces from the first image sensor, a first image of the first calibration plate for the reported first pose;
receive, via the one or more interfaces from the second image sensor, a second image of the second calibration plate for the reported first pose;
determine a first plurality of correspondences between the known physical positions of the first plurality of features relative to the first calibration plate and first positions of the first plurality of features detected in the first image;
determine a second plurality of correspondences between the known physical positions of the second plurality of features relative to the second calibration plate and second positions of the second plurality of features detected in the second image;
determine, based on the first plurality of correspondences, a first transform between the first coordinate system and the second coordinate system based, at least in part, on the first plurality of correspondences and the reported first pose; and
determine, based on the second plurality of correspondences, a second transform between the first coordinate system and the third coordinate system based, at least in part, on the second plurality of correspondences and the reported first pose,
wherein the first and second transformations allow the machine vision system to establish correspondences between features found in separate images taken by the first and second image sensors and the first coordinate system.

6. The machine vision system of claim 5, wherein the computer program is operable to cause the processor to determine a motion correction transform that compensates for a systematic motion error associated with the motion rendering device.

7. The machine vision system of claim 5, wherein the computer program is operable to cause the processor to re-calibrate the machine vision system after a first period of time, 10 comprising re-determining:
the second plurality of correspondences;
the first transformation; and
the second transformation.

8. The machine vision system of claim 7, wherein re-calibrating the machine vision system comprises adjusting one or more pre-calibrated parameters.

9. A machine vision system comprising:
one or more interfaces configured to provide communication with a motion rendering device, a first image sensor, and a second image sensor, wherein:
the motion rendering device is configured to provide at least one of a translational movement and an in-plane rotational movement, and is associated with a first coordinate system;
the motion rendering device is further configured to directly or indirectly carry a target object comprising a plurality of known features with unknown physical positions; and
the first image sensor and the second image sensor are configured to capture an image of a first subset and a second subset of the plurality of known features in the target object, respectively, and the first image sensor and the second image sensor are associated with a second coordinate system and a third coordinate system, respectively, wherein each of the first coordinate system, second coordinate system, and third coordinate system are different from each other; and
a processor configured to run a computer program stored in memory configured to:
send, via the one or more interfaces to the motion rendering device, first data configured to cause the motion rendering device to move to a requested first pose;
receive, via the one or more interfaces from the motion rendering device, a reported first pose;
receive, via the one or more interfaces from the first image sensor, a first image of the first subset of the plurality of features for the reported first pose;
receive, via the one or more interfaces from the second image sensor, a second image of the second subset of the plurality of features for the reported first pose image;
detect the first subset of known features on the target object in the first image;
detect the second subset of known features on the target object in the second image;
determine a first transform between the first coordinate system and the second coordinate system based, at least in part, on the detected first subset of the plurality of features and the reported first pose; and
determine a second transform between the first coordinate system and the third coordinate system based, at least in part, on the detected second subset of the plurality of features and the reported first pose,
wherein the first and second transforms allow the machine vision system to establish correspondences between features found in separate images taken by the first and second image sensors and the first coordinate system.

10. The machine vision system of claim 9, wherein the computer program is operable to cause the processor to determine a motion correction transform that compensates for a systematic motion error associated with the motion rendering device.

11. The machine vision system of claim 9, wherein the computer program is operable to cause the processor to re-calibrate the machine vision system after a first period of time, comprising re-determining:
the first subset of the plurality of features;
the second subset of the plurality of features;
the first transformation; and the second transformation.

12. The machine vision system of claim 11, wherein re-calibrating the machine vision system comprises adjusting one or more pre-calibrated parameters.

13. A machine vision system comprising:
one or more interfaces configured to provide communication with a motion rendering device, a first image sensor, and a second image sensor, wherein:
the motion rendering device is configured to provide at least one of a translational movement and an in-plane rotational movement, and is associated with a first coordinate system;
the motion rendering device is also configured to directly or indirectly carry the first image sensor and the second image sensor; and
the first image sensor and the second image sensor are configured to capture an image of a target object comprising a plurality of known features with unknown physical positions, and the first image sensor and the second image sensor are associated with a second coordinate system and a third coordinate system, respectively, wherein each of the first coordinate system, second coordinate system, and third coordinate system are different from each other; and
a processor configured to run a computer program stored in memory configured to:
send, via the one or more interfaces to the motion rendering device, first data configured to cause the motion rendering device to move to a requested first pose;
receive, via the one or more interfaces from the motion rendering device, a reported first pose;
receive, via the one or more interfaces from the first image sensor, a first image of a first subset of the plurality of known features for the reported first pose;
receive, via the one or more interfaces from the second image sensor, a second image of a second subset of the plurality of known features for the reported first pose;
detect the first subset of known features on the target object in the first image;
detect the second subset of known features on the target object in the second image;
determine a first transform between the first coordinate system and the second coordinate system based, at least in part, on the detected first subset of known features and the reported first pose; and
determine a second transform between the first coordinate system and the third coordinate system based, at least in part, on the detected second subset of known features and the reported first pose,
wherein the first and second transforms allow the machine vision system to establish correspondences between features found in separate images taken by the first and second image sensors and the first coordinate system.

14. The machine vision system of claim 13, wherein the computer program is operable to cause the processor to determine a motion correction transform that compensates for a systematic motion error associated with the motion rendering device.

15. The machine vision system of claim 13, wherein the computer program is operable to cause the processor to re-calibrate the machine vision system after a first period of time, comprising re-determining:

the first subset of the plurality of features;
the second subset of the plurality of features;
the first transformation; and
the second transformation.

16. The machine vision system of claim 15, wherein re-calibrating the machine vision system comprises adjusting one or more pre-calibrated parameters.

\* \* \* \* \*